US011247548B2

(12) United States Patent
Devreese et al.

(10) Patent No.: US 11,247,548 B2
(45) Date of Patent: Feb. 15, 2022

(54) MODULAR HEAD ASSEMBLY FOR AN ELECTRIC AXLE

(71) Applicant: DANA HEAVY VEHICLE SYSTEMS GROUP, LLC, Maumee, OH (US)

(72) Inventors: Thibault G. Devreese, Ghent (BE); Wouter Wa Galoppin, Kampenhout (BE); Nicholas W. Laforce, Whitehouse, OH (US); Lewis H. Nickell, Portage, MI (US); Robert L. Vailliencourt, Wauseon, OH (US); Steven J. Wesolowski, Waterville, OH (US); George A. Willford, Waterville, OH (US); Ned W. Wright, Toledo, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 185 days.

(21) Appl. No.: 16/500,010

(22) PCT Filed: May 24, 2018

(86) PCT No.: PCT/US2018/034374
§ 371 (c)(1),
(2) Date: Oct. 1, 2019

(87) PCT Pub. No.: WO2018/218011
PCT Pub. Date: Nov. 29, 2018

(65) Prior Publication Data
US 2020/0108706 A1    Apr. 9, 2020

Related U.S. Application Data

(60) Provisional application No. 62/511,040, filed on May 25, 2017.

(51) Int. Cl.
*F16H 57/02* (2012.01)
*B60K 1/00* (2006.01)
(Continued)

(52) U.S. Cl.
CPC ............. *B60K 1/00* (2013.01); *B60B 35/14* (2013.01); *B60B 35/163* (2013.01);
(Continued)

(58) Field of Classification Search
CPC .. B60K 1/00; B60K 17/165; B60K 2001/001; B60K 17/354; B60K 17/356;
(Continued)

(56) References Cited

U.S. PATENT DOCUMENTS 5,271,294 A    12/1993  Osenbaugh
6,431,298 B1    8/2002  Ruppert, Jr. et al.
(Continued)

FOREIGN PATENT DOCUMENTS

CN        103496320 A        1/2014
CN        105757210 A    *    7/2016
(Continued)

OTHER PUBLICATIONS

ISA European Patent Office, International Search Report and Written Opinion Issued in Application No. PCT/US2018/034374, dated Oct. 17, 2018, WIPO, 16 pages.

*Primary Examiner* — Justin Holmes
(74) *Attorney, Agent, or Firm* — McCoy Russell LLP

(57) ABSTRACT

A modular electric axle head assembly for a vehicle. An axle assembly of the vehicle includes a banjo portion with a first opening extending from an inner surface to an outer surface of an inboard side of the banjo portion. At least a portion of a differential assembly disposed within at the banjo portion of the axle assembly and is drivingly connected to at least a portion of a gear assembly. The gear assembly is also (Continued)

drivingly connected to a motor output shaft. At least a portion of the gear assembly is disposed within a hollow portion of a gear assembly housing. An outboard portion of the gear assembly housing has a mounting flange that is integrally connected to the inboard side of the banjo portion. A first and second protruding portion extends from the axle assembly mounting flange and provides rotational support for the differential assembly.

22 Claims, 18 Drawing Sheets

(51) Int. Cl.
    *B60B 35/14*      (2006.01)
    *B60B 35/16*      (2006.01)
    *B60K 17/16*      (2006.01)
    *B60T 1/06*      (2006.01)
    *F16H 37/08*      (2006.01)
    *F16H 57/021*      (2012.01)
    *F16H 57/029*      (2012.01)

(52) U.S. Cl.
    CPC ............ *B60K 17/165* (2013.01); *B60T 1/062* (2013.01); *F16H 37/08* (2013.01); *F16H 57/02* (2013.01); *F16H 57/021* (2013.01); *F16H 57/029* (2013.01); *B60K 2001/001* (2013.01); *F16H 2057/02034* (2013.01); *F16H 2057/02052* (2013.01)

(58) Field of Classification Search
    CPC ...... B60K 17/36; B60K 17/346; B60B 35/14; B60B 35/163; B60B 35/16; B60T 1/062; F16H 37/08; F16H 57/02; F16H 57/021; F16H 57/029; F16H 2057/02034; F16H 2057/02052; F16H 2048/423; B60Y 2200/1422; B60Y 2200/91; B60Y 2200/92

See application file for complete search history.

(56) References Cited

U.S. PATENT DOCUMENTS

| | | | |
|---|---|---|---|
| 2013/0284559 A1* | 10/2013 | Barton | ................ F16H 63/3425 192/219.5 |
| 2019/0219116 A1* | 7/2019 | Matsuura | ................ B60T 1/062 |

FOREIGN PATENT DOCUMENTS

| | | | | |
|---|---|---|---|---|
| CN | 105966230 A | | 9/2016 | |
| DE | 102017108748 B3 * | | 8/2018 | ............. F16H 37/04 |
| EP | 1288531 A2 * | | 3/2003 | ........... F16H 57/037 |

* cited by examiner

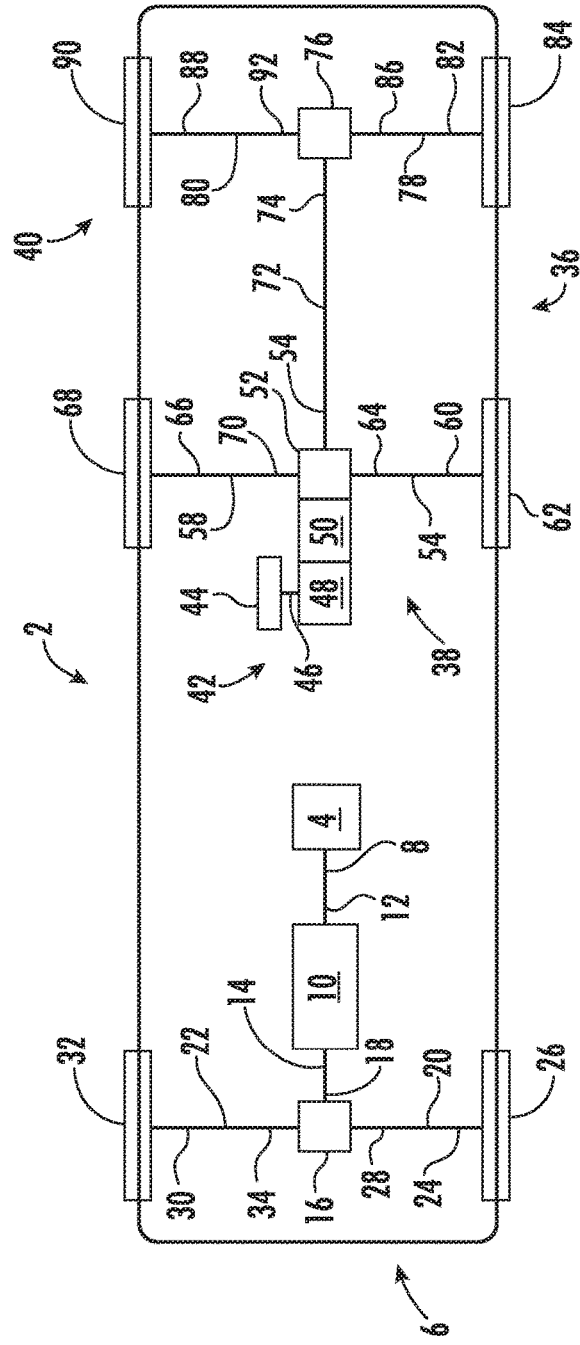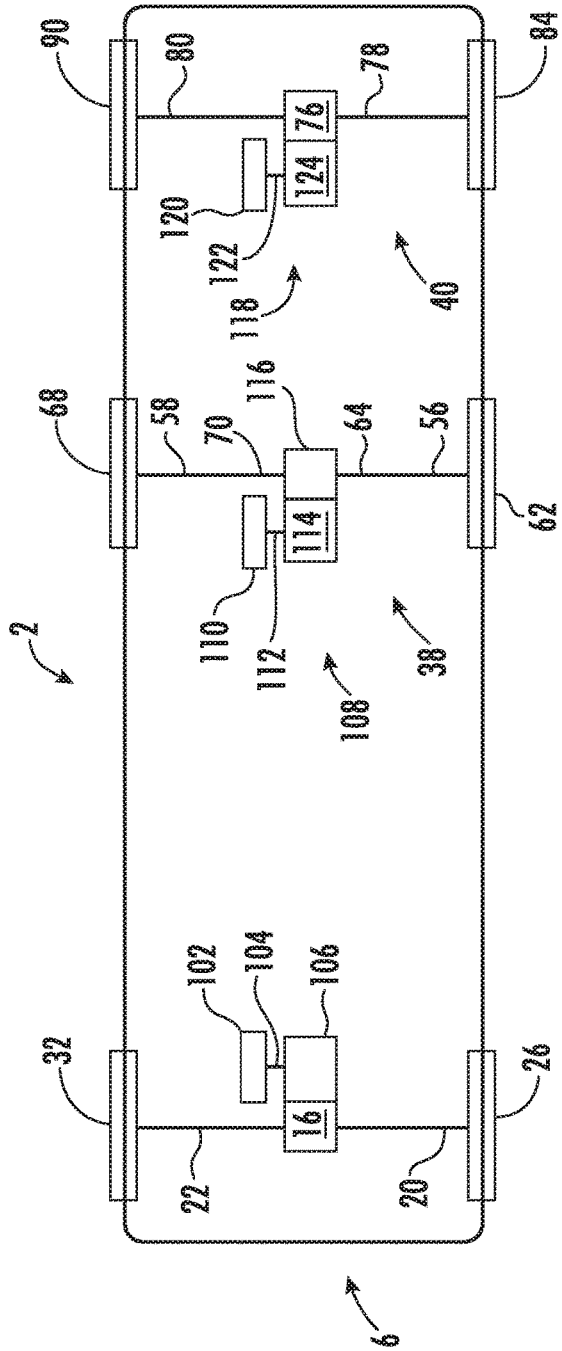

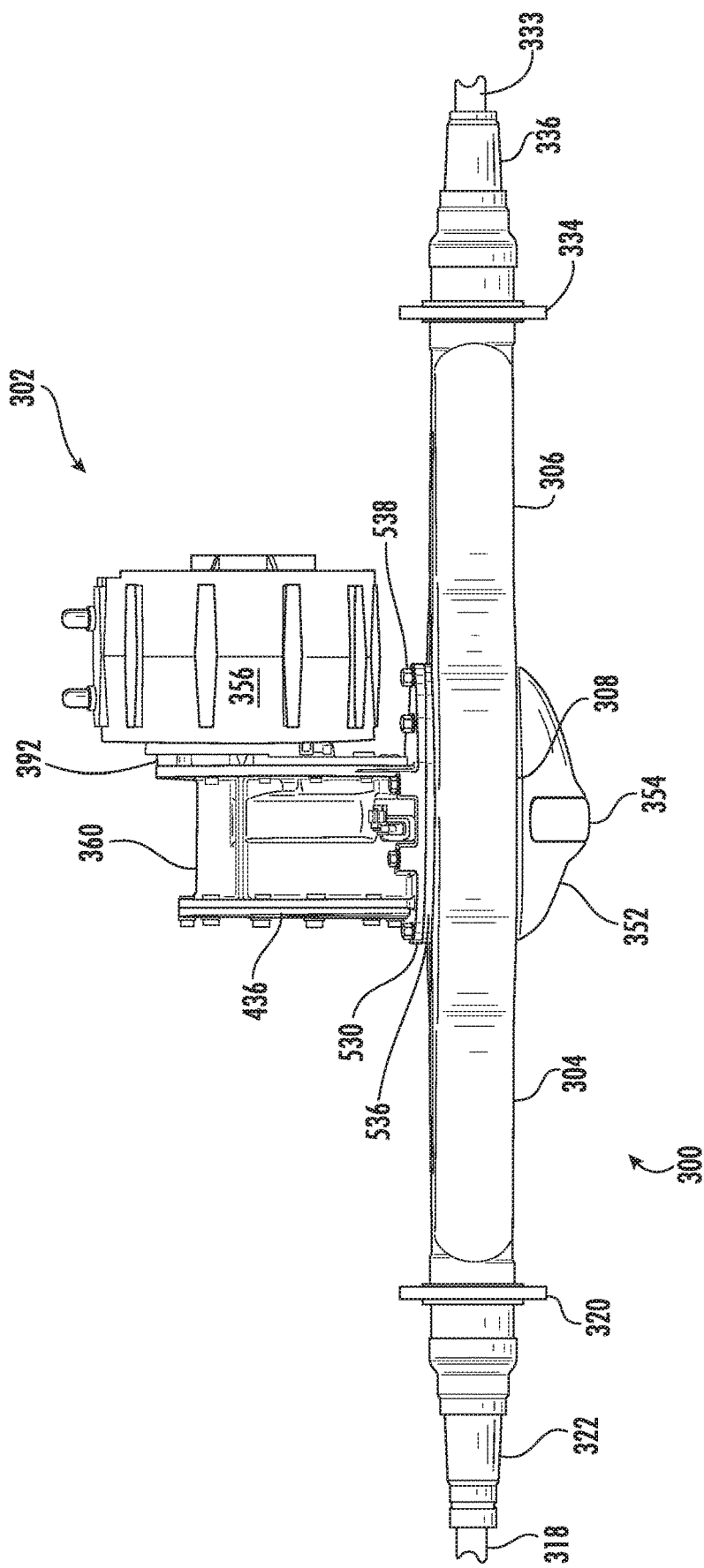

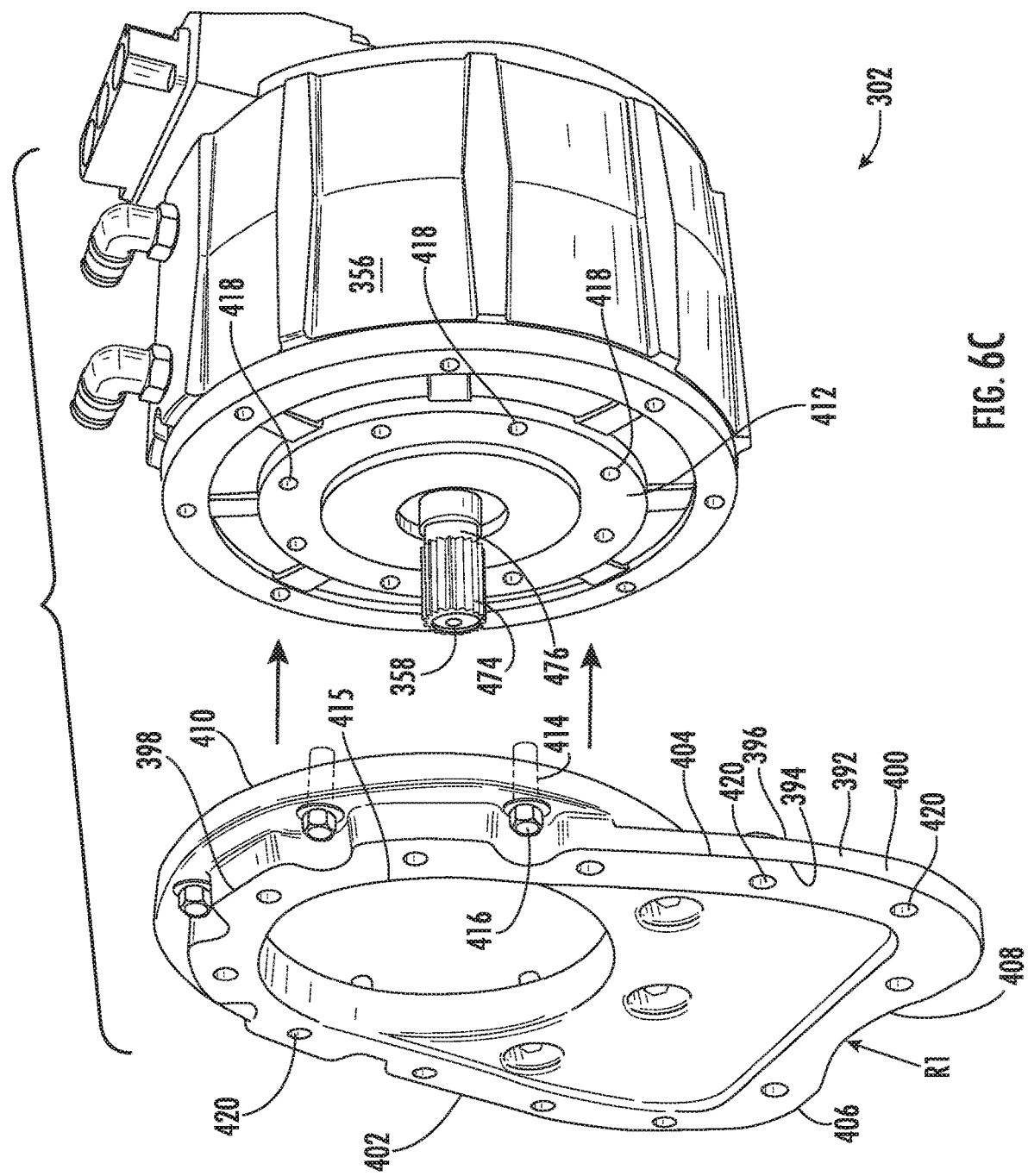

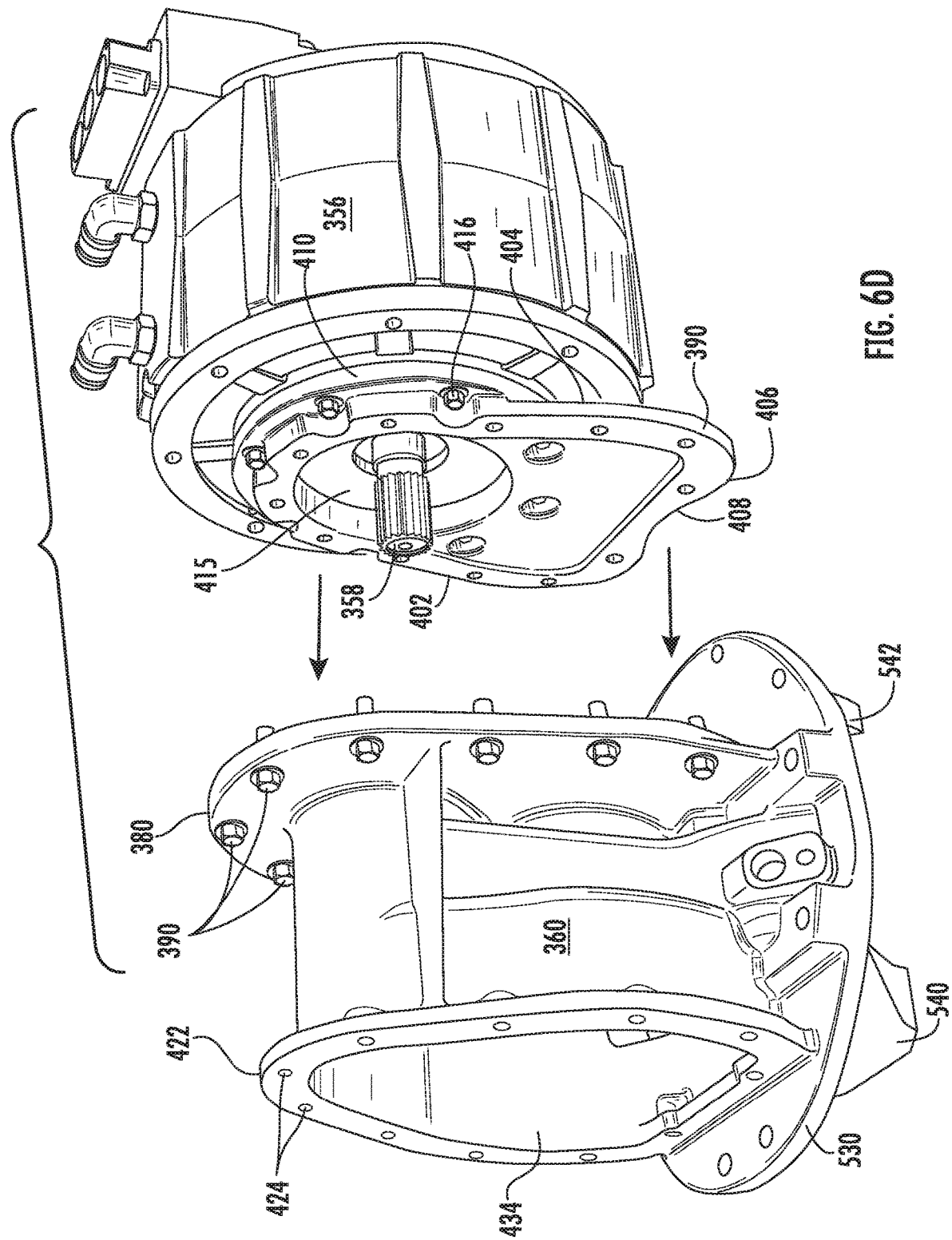

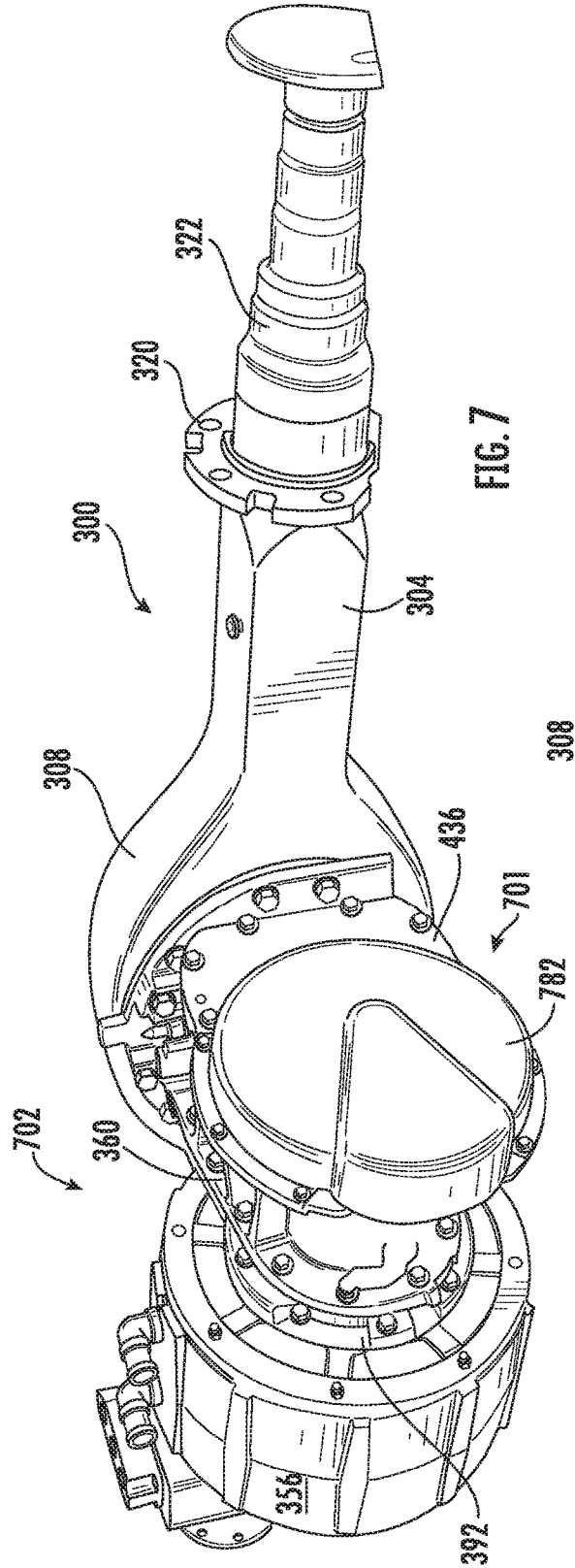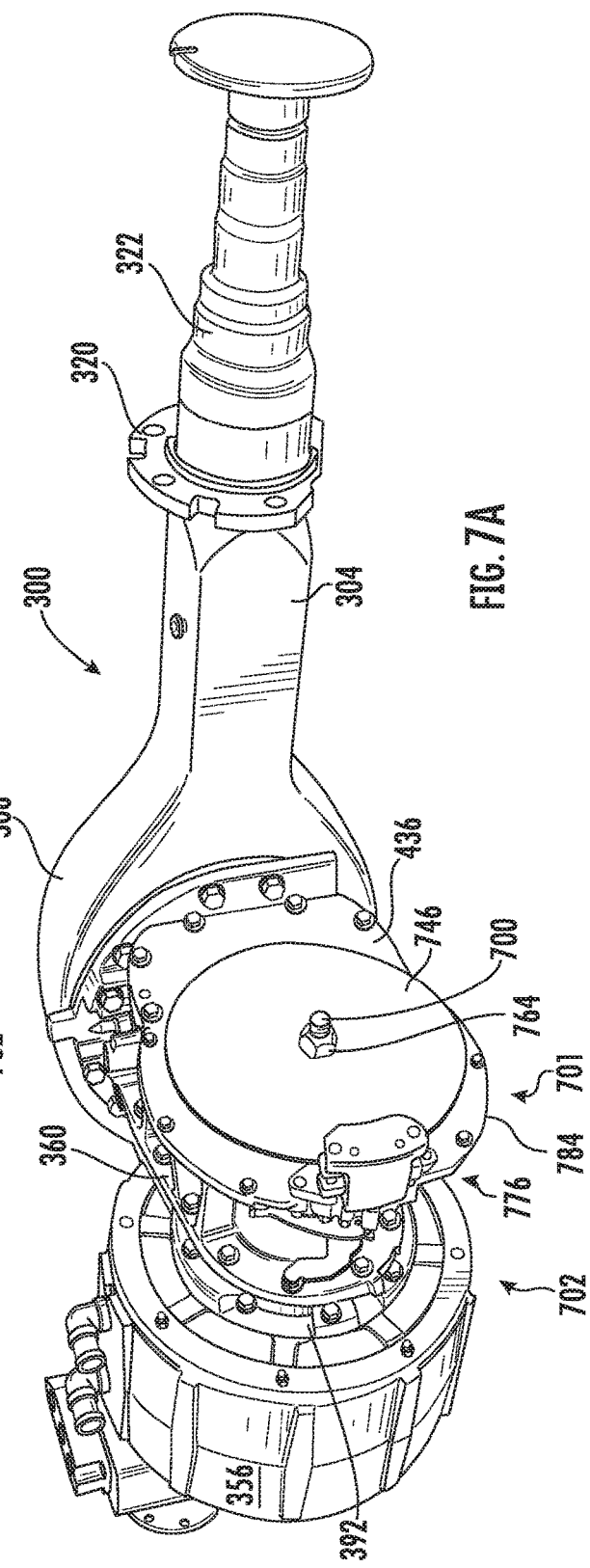

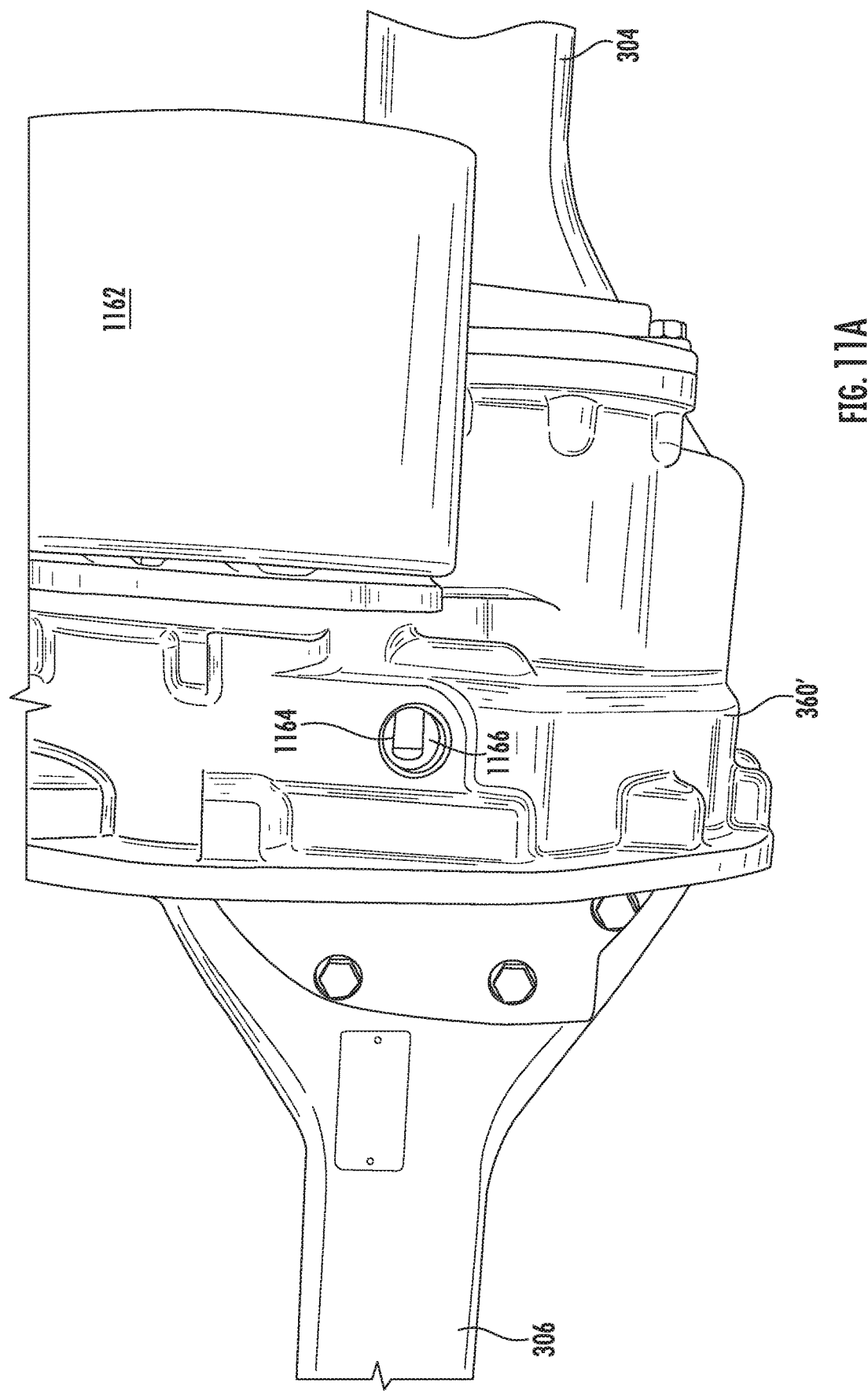

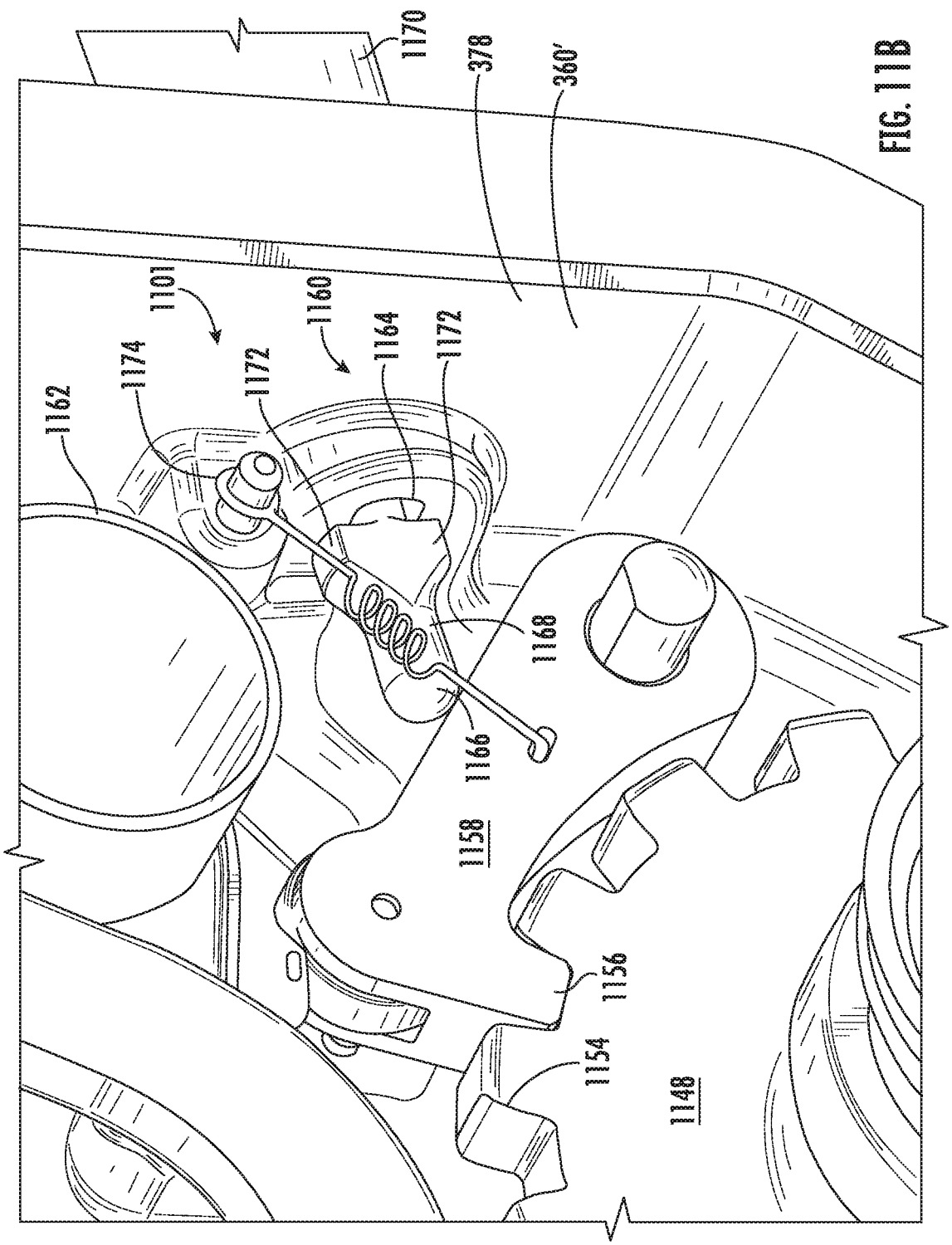

MODULAR HEAD ASSEMBLY FOR AN ELECTRIC AXLE

CROSS-REFERENCE TO RELATED APPLICATIONS

The present application claims the benefit to U.S. Provisional Patent Application No. 62/511,040 filed on May 25, 2017, which is incorporated herein by reference in its entirety.

FIELD OF THE DISCLOSURE

The present disclosure relates to a modular electric axle head assembly for use in an electric vehicle and/or a hybrid electric vehicle.

BACKGROUND OF THE DISCLOSURE

In recent years' considerable attention has been given to producing vehicles with increased fuel efficiency to reduce the overall fuel consumption of motorized vehicles all over the world. Additionally, in light of increasingly stringent emission controls considerable attention has been given to producing vehicles that produce fewer emissions. As a result, considerable attention is being given to producing hybrid vehicles and all electric vehicles that have a reduced fuel consumption and produce fewer emissions. Hybrid vehicles typically use two or more distinct power sources to provide the power necessary to drive the vehicle.

Many conventional hybrid vehicles incorporate the use of an internal combustion engine and an electric motor to provide the rotational power necessary to drive the vehicle. The electric motor of the hybrid vehicle alone or in combination with the internal combustion engine provides the rotational power necessary to drive a front or rear axle system of the vehicle. Additionally, the internal combustion engine of some hybrid vehicles is used to provide the rotational power necessary to drive the front axle system, the rear axle system or a tandem axle system of the vehicle. These vehicles require the use of specialized drive-line and axle system components that are expensive to manufacture and maintain. It would therefore be advantageous to develop a modular electric axle head assembly that can be attached to and used in combination with a conventional axle assembly.

SUMMARY OF THE DISCLOSURE

A modular electric axle head assembly for a vehicle. An axle assembly of the vehicle includes a banjo portion with a first opening extending from an inner surface to an outer surface of an inboard side of the banjo portion. At least a portion of a differential assembly disposed within at the banjo portion of the axle assembly and is drivingly connected to at least a portion of a gear assembly. The gear assembly is also drivingly connected to a motor output shaft. At least a portion of the gear assembly is disposed within a hollow portion of a gear assembly housing. An outboard portion of the gear assembly housing has a mounting flange that is integrally connected to the inboard side of the banjo portion. A first and second protruding portion extends from the axle assembly mounting flange and provides rotational support for the differential assembly.

According to an aspect of the disclosure, the gear assembly of the modular electric axle head assembly may include a first gear shaft having a first gear and a second gear shaft having a second gear and a third gear. At least a portion of the second gear may be drivingly connected to the first gear and at least a portion of the third gear may be drivingly connected to at least a portion of a ring gear of the differential assembly.

According to an aspect of the disclosure, the first gear of the gear assembly has a plurality of first gear teeth, the second gear has a plurality of second gear teeth and the third gear has a plurality of third gear teeth. The plurality of first, second and third gear teeth may have a helix angle that reduces and/or eliminates an amount of axial force experienced by the second gear shaft of the gear assembly when in operation.

According to any of the previous aspect of the disclosure, the gear assembly may further include an opening that extends from the inner surface to the outer surface of the inboard portion of a first end of the gear assembly housing. At least a portion of the opening in the inboard portion of the first end of the gear assembly housing provides rotational support for at least a portion of a first end portion of the first gear shaft. At least a portion of one or more first bearing assemblies are interposed between an outer surface of the first end portion of the first gear shaft and a surface defining the opening in the inboard portion of the first end of the gear assembly housing.

According to any of the previous aspect of the disclosure, the modular electric axle head assembly may further include a gear housing cover having a first side and a second side. The gear housing cover may have a size and shape to seal the opening in the inboard portion of the first end of the gear assembly housing. At least a portion of the gear housing cover may be integrally connected to at least a portion of the first end of the gear assembly housing.

According to any of the previous aspect of the disclosure, at least a portion of the second side of the gear housing cover may be in direct contact with at least a portion of the one or more first bearing assemblies.

According to any of the previous aspect of the disclosure, the gear housing cover may further include a receiving portion in the second side of the gear housing cover and the reviving portion in the second side of the gear housing cover may be of a size and shape to receive and/or retain at least a portion of the first end portion of the first gear shaft.

According to any of the previous aspect of the disclosure, the gear assembly housing may further include a receiving portion in the inner surface of the outboard portion of a first end portion of the gear assembly housing. At least a portion of one or more third bearing assemblies may be interposed between an outer surface of a first end portion of the second gear shaft and a surface defining the receiving portion in the inner surface of the outboard portion of the first end portion of the gear assembly housing.

According to any of the previous aspect of the disclosure, the modular electric axle head assembly may further include a motor mounting member having a first side, a second side, an inboard portion and an outboard portion. At least a portion of the first side of the motor mounting member may be integrally connected to at least a portion of a second end of the gear assembly housing. The motor mounting member may further include a motor mounting portion on the second side of the motor mounting member. At least a portion of a motor may be integrally connected to at least a portion of the motor mounting portion of the motor mounting member. A motor output shaft extending through a motor mounting member opening extending from the first side to the second side of the motor mounting member.

According to any of the previous aspect of the disclosure, the motor mounting member opening may be of a size and shape needed to provide rotational support for at least a portion of a second end portion of the first gear shaft and the motor output shaft. At least a portion of one or more second bearing assemblies may be interposed between an outer surface of the second end portion of the first gear shaft and a surface defining the motor mounting member opening.

According to any of the previous aspect of the disclosure, the motor mounting member may further include a receiving portion in the first side of the outboard portion of the motor mounting member. At least a portion of one or more fourth bearing assemblies may be interposed between an outer surface of the second end portion of the second gear shaft and a surface defining the receiving portion of the motor mounting member.

According to any of the previous aspect of the disclosure, the one or more third bearing assemblies may be one or more cylindrical roller bearing assemblies and the one or more fourth bearing assemblies may be one or more cylindrical roller bearing assemblies.

According to any of the previous aspect of the disclosure, modular electric axle head assembly may further include a brake assembly.

According to any of the previous aspect of the disclosure, the brake assembly may include a parking gear and a parking pawl that is selectively engagable with the parking gear. At least a portion of the parking gear may be integrally connected to at least a portion of the first gear shaft and the parking pawl may be driven into engagement with the parking gear by using an actuation mechanism.

According to any of the previous aspect of the disclosure, the gear assembly housing may further include a brake assembly aperture extending from the inner surface to the outer surface of the gear assembly housing. The brake assembly aperture may be of a size and shape to receive and retain at least a portion of an assembly tool. When the assembly tool is retained within the gear assembly housing, at least a portion of a first end portion of the assembly tool drives the parking pawl into engagement with the parking gear thereby providing the space needed to assemble the actuation mechanism into the gear assembly of the modular electric axle head assembly.

According to any of the previous aspect of the disclosure, the brake assembly of the modular electric axle head assembly may include a rotor portion and a caliper assembly that is selectively engagable with the rotor portion of the brake assembly. At least a portion of the rotor portion of the brake assembly may be integrally connected to at least a portion of the first gear shaft of the gear assembly.

According to any of the previous aspect of the disclosure, the modular electric axle head assembly may further include a braking assembly cover having a size and shape needed to encase at least a portion of the rotor portion and the caliper assembly of the brake assembly.

According to any of the previous aspect of the disclosure, the brake assembly may be a drum brake assembly that is integrally connected to at least a portion of the first gear shaft.

According to any of the previous aspect of the disclosure, the modular electric axle head assembly may further include a strain relief member that is integrally connected to at least a portion of the motor mounting member. The strain relief member may have one or more retention apertures having a size and shape needed to receive and/or retain at least a portion of one or more terminals or data links used in the operation and/or control of the motor.

According to any of the previous aspect of the disclosure, the modular electric axle head assembly may further include a motor stabilizing assembly that is integrally connected to at least a portion of the motor and an axle half shaft housing of the axle assembly.

According to any of the previous aspect of the disclosure, the modular electric axle head assembly may further include a gear housing cover having a first side, a second side, an inboard portion and an outboard portion. At least a portion of the gear housing cover may be integrally connected to at least a portion of a first end of the gear assembly housing. The inboard portion of the second side of the gear housing cover may have a first receiving portion and the outboard portion of the second side of the gear housing cover may have a second receiving portion. At least a portion of the first end portion of the first gear shaft may be received within at least a portion of one or more first bearing assemblies disposed within the first receiving portion of the gear housing cover. Additionally, at least a portion of a first end portion of the second gear shaft may be received within one or more third bearing assemblies disposed within at least a portion of the second receiving portion of the gear housing cover.

According to any of the previous aspect of the disclosure, the gear assembly housing may further include a receiving portion in the inner surface of the outboard portion of s the aid second end portion of the gear assembly housing. At least a portion of a second end portion of the second gear shaft may be received within one or more fourth bearing assemblies disposed within at least a portion of the receiving portion in the inner surface of the outboard portion of the second end portion of the gear assembly housing.

According to any of the previous aspect of the disclosure, the one or more third bearing assemblies may be one or more cylindrical roller bearing assemblies and the one or more fourth bearing assemblies may be one or more cylindrical roller bearing assemblies.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 1 is a schematic top-plan view of a vehicle having one or more modular electric axle head assemblies according to an embodiment of the disclosure;

FIG. 2 is a schematic top-plan view of the vehicle illustrated in FIG. 1 according to an alternative embodiment of the disclosure where the vehicle has one or more modular electric axle head assemblies according to an embodiment of the disclosure;

FIG. 6 is a schematic top-plan view of a modular electric axle head assembly according to an embodiment of the disclosure;

FIG. 6C is a schematic exploded perspective view of a portion of a modular electric axle head assembly according to the embodiment of the disclosure illustrated in FIGS. 6-6B;

FIG. 6D is a schematic exploded perspective view of a portion of the modular electric axle head assembly according to the embodiment of the disclosure illustrated in FIGS. 6-6C;

FIG. 7 is a is a schematic perspective view of an electric axle with the modular electric axle head assembly according to an alternative embodiment of the disclosure;

FIG. 7A is a schematic perspective view of a portion of the electric axle with the modular electric axle head assembly according to the embodiment illustrated in FIG. 7;

FIG. 11A is a schematic perspective view of a portion of the modular electric axle head assembly illustrated in FIG. 11 of the disclosure;

FIG. 11B is a schematic perspective view of a portion so the modular electric axle head assembly illustrated in FIGS. 11 and 11A of the disclosure;

DETAILED DESCRIPTION OF THE DISCLOSURE

Figure 3:
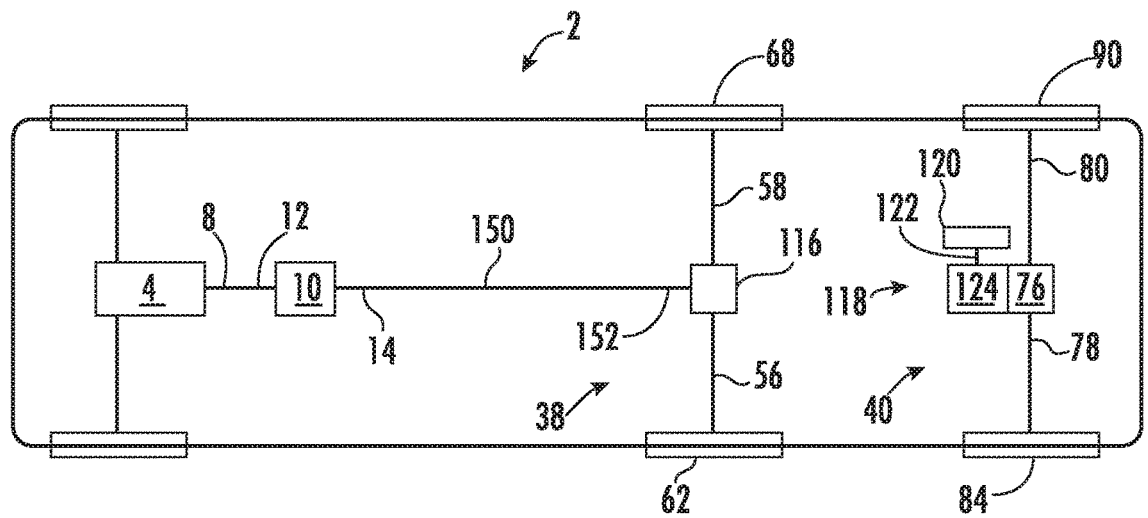
FIG. 3 is a schematic top-plan view of the vehicle illustrated in FIGS. 1 and 2 according to still another embodiment of the disclosure where the vehicle has one or more modular electric axle head assemblies according to an embodiment of the disclosure.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the modular electric axle head assembly disclosed herein may be used in automotive, off-road vehicle, all-terrain vehicle, construction, structural, marine, aerospace, locomotive, military, machinery, robotic and/or consumer product applications. Additionally, as a non-limiting example, the modular electric axle head assembly disclosed herein may also be used in passenger vehicle, electric vehicle, hybrid vehicle, commercial vehicle, autonomous vehicles, semi-autonomous vehicles and/or heavy vehicle applications.

Additionally, it is within the scope of this disclosure that the modular electric axle head assembly disclosed herein is for use with an axle assembly of a motor vehicle. As a non-limiting example, the modular electric axle head assembly disclosed herein may be used in connection with a rear axle system, a front axle system, a forward tandem axle system and/or a rear tandem axle system to drive one or more wheels of the vehicle.

FIG. 1 is a schematic top-plan view of a vehicle 2 having one or more modular electric axle head assemblies according to an embodiment of the disclosure. It is within the scope of this disclosure that the vehicle 2 may be a hybrid vehicle having an engine 4 that is used to provide the rotational power necessary to drive a front axle system 6 of the vehicle 2. As non-limiting example, the engine 4 of the vehicle 2 can be an internal combustion engine, an external combustion engine, a heat engine, a gas turbine and/or a steam turbine. Drivingly connected to an end of the engine 4 is an engine output shaft 8.

Drivingly connecting the engine 4 of the vehicle 2 to a transmission 10 is a transmission input shaft 12. As illustrated in FIG. 1 of the disclosure, the transmission input shaft 12 is drivingly connected to an end of the engine output shaft 8 opposite the engine 4. The transmission 10 is a power management system which provides controlled application of the rotational power generated by the engine 4 by means of a gear box.

A transmission output shaft 14 is drivingly connected to an end of the transmission 10 opposite the transmission input shaft 12. The transmission output shaft 14 drivingly connects the transmission 10 to a differential 16 of the front axle system 6 via a front axle differential input shaft 18. The front axle differential 16 is a set of gears that allows the outer drive wheel(s) of the vehicle 2 to rotate at a faster rate that the inner drive wheel(s). The rotational power is transmitted through the front axle system 6 as described in more detail below.

The front axle system 6 further includes a first front axle half shaft 20 and a second front axle half shaft 22. The first front axle half shaft 20 extends substantially perpendicular to the front axle differential input shaft 18. A first end portion 24 of the first front axle half shaft 20 is drivingly connected to a first front axle wheel assembly 26 and a second end portion 28 of the first front axle half shaft 20 is drivingly connected to an end of the front axle differential 16. As a non-limiting example, the second end portion 28 of the first front axle half shaft 20 is drivingly connected to a differential side gear, a separate stub shaft, a separate coupling shaft, a first front axle differential output shaft, a first front axle half shaft disconnect system and/or a shaft that is formed as part of a differential side gear.

The second front axle half shaft 22 also extends substantially perpendicular to the front axle differential input shaft 18. A first end portion 30 of the second front axle half shaft 22 is drivingly connected to a second front axle wheel assembly 32 and a second end portion 34 of the second front axle half shaft 22 is drivingly connected to an end of the front axle differential 16 opposite the first front axle input shaft 20. As a non-limiting example, the second end portion 34 of the second front axle half shaft 22 is drivingly connected to a differential side gear, a separate stub shaft, a separate coupling shaft, a second front axle differential output shaft, a second front axle half shaft disconnect system and/or a shaft that is formed as part of a differential side gear.

The vehicle 2 further includes a rear tandem axle system 36 having a forward tandem axle system 38 and a rear tandem axle system 40. As illustrated in FIG. 1 of the disclosure, the rear tandem axle system 36 includes a modular electric axle head assembly 42. The modular electric axle head assembly 42 provides the rotational power needed to drive the forward tandem axle system 38 and/or the rear tandem axle system 40 of the vehicle 2. The modular electric axle head assembly 42 includes an electric motor 44 that is drivingly connected to an electric motor output shaft 46. Drivingly connected to an end of the electric motor output shaft 46 opposite the electric motor 44 is a gear assembly 48. The gear assembly 48 is a system of gears (not shown) that reduces the overall rotational speed and increases the torque generated by the electric motor 44 of the modular electric axle head assembly 42.

Drivingly connected to an end of the gear assembly 48 of the modular electric axle head assembly 42 opposite the electric motor 44 is an inter-axle differential 50 of a forward tandem axle differential 52 of the forward tandem axle system 38. The inter-axle differential 50 is a device that divides the rotational power generated by the electric motor 44 between the forward tandem axle system 38 and the rear tandem axle system 40 of the vehicle 2.

As illustrated in FIG. 1 of the disclosure, the inter-axle differential 50 is drivingly connected to the forward tandem axle differential 52 and a forward tandem axle system output shaft 54. The forward tandem axle differential 52 is a set of gears that allows the outer drive wheel(s) of a vehicle 2 to rotate at a faster rate than the inner drive wheel(s).

The forward tandem axle system 38 further includes the use of a first forward tandem axle half shaft 54 and a second forward tandem axle half shaft 58. A first end portion 60 of the first forward tandem axle half shaft 54 is drivingly connected to a first forward tandem axle wheel assembly 62 and a second end portion 64 of the first forward tandem axle half shaft 54 is drivingly connected to a side of the forward tandem axle differential 52. As a non-limiting example, the second end portion 64 of the first forward tandem axle half shaft 54 is drivingly connected to a forward tandem axle differential side gear, a separate stub shaft, a separate coupling shaft, a first forward tandem axle differential output shaft, a first forward tandem axle half shaft disconnect system and/or a shaft that is formed as part of a forward tandem axle differential side gear.

As illustrated in FIG. 1 of the disclosure, a first end portion 66 of the second forward tandem axle half shaft 58 is drivingly connected to a second forward tandem axle wheel assembly 68. A second end portion 70 of the second forward tandem axle half shaft 58 is drivingly connected to a side of the forward tandem axle differential 52 opposite the first forward tandem axle half shaft 54. As a non-limiting example, the second end portion 70 of the second forward tandem axle half shaft 58 is drivingly connected to a forward tandem axle differential side gear, a separate stub shaft, a separate coupling shaft, a second forward tandem axle differential output shaft, a second forward tandem axle half shaft disconnect system and/or a shaft that is formed as part of a forward tandem axle differential side gear.

One end of the forward tandem axle system output shaft 54 is drivingly connected to a side of the inter-axle differential 50 opposite the modular electric axle head assembly 42. Drivingly connected to an end of the forward tandem axle system output shaft 54 opposite the inter-axle differential 50 is a shaft 72. The shaft 72 extends from the forward tandem axle system 38 toward the rear tandem axle system 40 of the vehicle 2. As a non-limiting example, the shaft 72 is a drive shaft, a prop shaft, a Cardan shaft, a double cardan shaft, a universal joint shaft or a universal coupling shaft.

Drivingly connected to an end of the shaft 72 opposite the forward tandem axle system output shaft 54 is a rear tandem axle system input shaft 74. An end of the rear tandem axle system input shaft 74 opposite the shaft 72 is drivingly connected to a rear tandem axle differential 76 of the rear tandem axle system 40 of the vehicle 2. The rear tandem axle differential 76 is a set of gears that allows the outer drive wheel(s) of a vehicle 2 to rotate at a faster rate than the inner drive wheel(s). As it can be seen by referencing FIG. 1 of the disclosure, the rear tandem axle system input shaft 74 drivingly connects the inter-axle differential 50 to the rear tandem axle differential 76 of the rear tandem axle system 40 of the vehicle 2. The rotational power is transmitted through the rear tandem axle system 40 as described in more detail below.

The rear tandem axle system 40 further includes the use of a first rear tandem axle half shaft 78 and a second rear tandem axle half shaft 80. The first rear tandem axle half shaft 78 extends substantially perpendicular to the rear tandem axle system input shaft 74. A first end portion 82 of the first rear tandem axle half shaft 78 is drivingly connected to a first rear tandem axle wheel assembly 84 and a second end portion 86 of the first rear tandem axle half shaft 78 is drivingly connected to a side of the rear tandem axle differential 76. As a non-limiting example, the second end portion 86 of the first rear tandem axle half shaft 78 is drivingly connected to a rear tandem axle differential side gear, a separate stub shaft, a separate coupling shaft, a first rear tandem axle differential output shaft, a first rear tandem axle half shaft disconnect system and/or a shaft that is formed as part of a rear tandem axle differential side gear.

Extending substantially perpendicularly with the rear tandem axle system input shaft 74 is the second rear tandem axle half shaft 80. A first end portion 88 of the second rear tandem axle half shaft 80 is drivingly connected to a second rear tandem axle wheel assembly 90. As illustrated in FIG. 1 of the disclosure, a second end portion 92 of the second rear tandem axle half shaft 80 is drivingly connected to a side of the rear tandem axle differential 76 opposite the first rear tandem axle half shaft 78. As a non-limiting example, the second end portion 92 of the second rear tandem axle half shaft 80 is drivingly connected to a rear tandem axle differential side gear, a separate stub shaft, a separate coupling shaft, a second rear tandem axle differential output shaft, a second rear tandem axle half shaft disconnect system and/or a shaft that is formed as part of a rear tandem axle differential side gear.

FIG. 2 is a schematic top-plan view of the vehicle 2 illustrated in FIG. 1 according to an alternative embodiment of the disclosure where the vehicle 2 has one or more modular electric axle head assemblies according to an embodiment of the disclosure. The vehicle 2 illustrated in FIG. 2 of the disclosure is the same as the vehicle 2 illustrated in FIG. 1, except where specifically noted below. As illustrated in FIG. 2 of the disclosure, the vehicle 2 does not include the engine 2 and the forward tandem axle differential 52 having the inter-axle differential 50 illustrated in FIG. 1. In accordance with this embodiment of the disclosure, the vehicle 2 is an electric drive vehicle.

Drivingly connected to the front axle differential 16 of the front axle system 6 of the vehicle 2 is a front axle modular electric axle head assembly 100 according to an embodiment of the disclosure. The front axle modular electric axle head assembly 100 provides the rotational power necessary to drive the front axle system 6 of the vehicle 2.

The front axle modular electric axle head assembly 100 includes an electric motor 102 that is drivingly connected to an electric motor output shaft 104. Drivingly connected to an end of the electric motor output shaft 104 opposite the electric motor 102 is a gear assembly 106. The gear assembly 106 is a system of gears (not shown) that reduces the overall rotational speed and increases the torque generated by the electric motor 102 of the front axle modular electric axle head assembly 100. Drivingly connected to an end of the gear assembly 106 of the front axle modular electric axle head assembly 100 opposite the electric motor 102 is the front axle differential 16 of the front axle system 6.

As illustrated in FIG. 2 of the disclosure, a forward tandem axle modular electric axle head assembly 108 provides the rotational power necessary to drive the forward tandem axle system 38 of the vehicle 2. The forward tandem axle modular electric axle head assembly 108 includes an electric motor 110 that is drivingly connected to an electric motor output shaft 112. Drivingly connected to an end of the electric motor output shaft 112 opposite the electric motor 110 is a gear assembly 114. The gear assembly 114 is a system of gears (not shown) that reduces the overall rotational speed and increases the torque generated by the electric motor 110 of the forward tandem axle modular electric axle head assembly 108.

Drivingly connected to an end of the gear assembly 114 opposite the electric motor 110 is a forward tandem axle differential 116 of the forward tandem axle system 38 of the vehicle 2. The forward tandem axle differential 116 is a set of gears that allows the outer drive wheel(s) of a vehicle 2 to rotate at a faster rate than the inner drive wheel(s).

As illustrated in FIG. 2 of the disclosure, the second end portion 64 of the first forward tandem axle half shaft 56 is drivingly connected to a side of the forward tandem axle differential 116. As a non-limiting example, the second end portion 64 of the first forward tandem axle half shaft 56 is drivingly connected to a forward tandem axle differential side gear, a separate stub shaft, a separate coupling shaft, a first forward tandem axle differential output shaft, a first forward tandem axle half shaft disconnect system and/or a shaft that is formed as part of a forward tandem axle differential side gear.

The second end portion 70 of the second forward tandem axle half shaft 58 is drivingly connected to a side of the forward tandem axle differential 116 opposite the first forward tandem axle half shaft 56. As a non-limiting example, the second end portion 70 of the second forward tandem axle half shaft 58 is drivingly connected to a forward tandem axle differential side gear, a separate stub shaft, a separate coupling shaft, a second forward tandem axle differential output shaft, a second forward tandem axle half shaft disconnect system and/or a shaft that is formed as part of a forward tandem axle differential side gear.

A rear tandem axle modular electric axle head assembly 118 provides the rotational power necessary to drive the rear tandem axle system 40 of the vehicle 2. The rear tandem axle modular electric axle head assembly 118 includes an electric motor 120 that is drivingly connected to an electric motor output shaft 122. Drivingly connected to an end of the electric motor output shaft 122 opposite the electric motor 120 is a gear assembly 124. The gear assembly 124 is a system of gears (not shown) that reduces the overall rotational speed and increases the torque generated by the electric motor 120 of the rear tandem axle modular electric axle head assembly 118. Drivingly connected to an end of the gear assembly 124 opposite the electric motor 120 is the rear tandem axle differential 76 of the rear tandem axle system 40 of the vehicle 2.

FIG. 3 is a schematic top-plan view of the vehicle 2 illustrated in FIGS. 1 and 2 according to still another embodiment of the disclosure where the vehicle 2 has one or more modular electric axle head assemblies according to an embodiment of the disclosure. The vehicle 2 illustrated in FIG. 3 of the disclosure is the same as the vehicle 2 illustrated in FIGS. 1 and 2, except where specifically noted below. As illustrated in FIG. 3 of the disclosure, the vehicle 2 does not include the front axle modular electric axle head assembly 100 illustrated in FIG. 2. In accordance with this embodiment of the disclosure, the vehicle 2 is a hybrid vehicle.

Drivingly connected to an end of the transmission output shaft 14 opposite the transmission 10 is a shaft 150. As illustrated in FIG. 3 of the disclosure, the shaft 150 extends from the transmission 10 to the forward tandem axle system 38 of the vehicle 2. As a non-limiting example, the shaft 72 is a drive shaft, a prop shaft, a Cardan shaft, a double cardan shaft, a universal joint shaft or a universal coupling shaft.

Drivingly connected to an end of the shaft 150 opposite the transmission 10 is a forward tandem axle system input shaft 152. An end of the forward tandem axle system input shaft 152 opposite the shaft 150 is drivingly connected to the forward tandem axle differential 116 of the forward tandem axle system 38 of the vehicle 2.

In accordance with this embodiment of the disclosure illustrated in FIG. 3, the rear tandem axle system 40 of the vehicle 2 includes the rear tandem axle modular electric axle head assembly 118. The rear tandem axle modular electric axle head assembly 118 provides the rotational power necessary to drive rear tandem axle system 40 of the vehicle 2. According to this embodiment of the disclosure, the rear tandem axle modular electric axle head assembly 118 may be activated to selectively transition the vehicle 2 from a 6×2 driving mode to a 6×4 driving mode on the fly without having to stop the vehicle 2.

Figure 4:
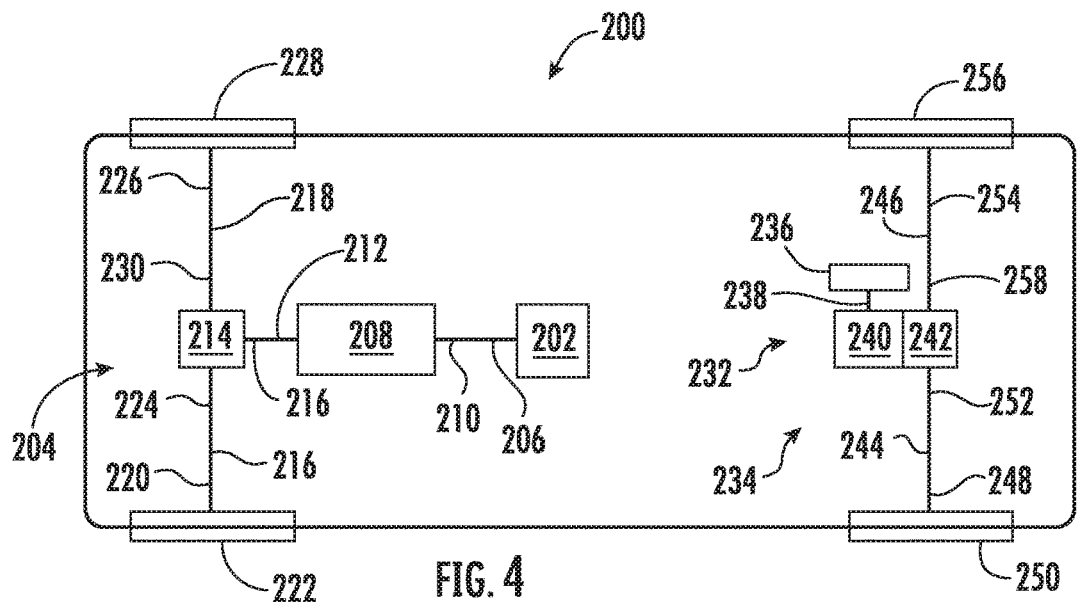
FIG. 4 is a schematic top-plan view of another vehicle having one or more modular electric axle head assemblies according to an embodiment of the disclosure.

FIG. 4 is a schematic top-plan view of another vehicle 200 having one or more modular electric axle head assemblies according to an embodiment of the disclosure. It is within the scope of this disclosure that the vehicle 200 may be a hybrid vehicle having an engine 202 that is used to provide the rotational power necessary to drive a front axle system 204 of the vehicle 200. As non-limiting example, the engine 202 of the vehicle 200 can be an internal combustion engine, an external combustion engine, a heat engine, a gas turbine and/or a steam turbine. Drivingly connected to an end of the engine 202 is an engine output shaft 206.

Drivingly connecting the engine 202 of the vehicle 200 to a transmission 208 is a transmission input shaft 210. As illustrated in FIG. 4 of the disclosure, the transmission input shaft 210 is drivingly connected to an end of the engine output shaft 206 opposite the engine 202. The transmission 208 is a power management system which provides controlled application of the rotational power generated by the engine 202 by means of a gear box.

A transmission output shaft 212 is drivingly connected to an end of the transmission 208 opposite the transmission input shaft 210. The transmission output shaft 212 drivingly connects the transmission 208 to a differential 214 of the front axle system 204 via a front axle differential input shaft 216. The front axle differential 214 is a set of gears that allows the outer drive wheel(s) of the vehicle 200 to rotate at a faster rate that the inner drive wheel(s). The rotational power is transmitted through the front axle system 204 as described in more detail below.

The front axle system 204 further includes a first front axle half shaft 216 and a second front axle half shaft 218. The first front axle half shaft 216 extends substantially perpendicular to the front axle differential input shaft 216. A first end portion 220 of the first front axle half shaft 216 is drivingly connected to a first front axle wheel assembly 222 and a second end portion 224 of the first front axle half shaft 216 is drivingly connected to an end of the front axle differential 214. As a non-limiting example, the second end portion 224 of the first front axle half shaft 216 is drivingly connected to a differential side gear, a separate stub shaft, a separate coupling shaft, a first front axle differential output shaft, a first front axle half shaft disconnect system and/or a shaft that is formed as part of a differential side gear.

Extending substantially perpendicular to the front axle differential input shaft 216 is the second front axle half shaft 218 of the front axle system 204 of the vehicle 200. A first end portion 226 of the second front axle half shaft 218 is drivingly connected to a second front axle wheel assembly 228 and a second end portion 230 of the second front axle half shaft 218 is drivingly connected to an end of the front axle differential 214 opposite the first front axle input shaft 216. As a non-limiting example, the second end portion 230 of the second front axle half shaft 218 is drivingly connected to a differential side gear, a separate stub shaft, a separate coupling shaft, a second front axle differential output shaft, a second front axle half shaft disconnect system and/or a shaft that is formed as part of a differential side gear.

As illustrated in FIG. 4 of the disclosure, a rear axle modular electric axle head assembly 232 provides the rotational power necessary to drive a rear axle system 234 of the vehicle 200. The rear axle modular electric axle head assembly 232 includes an electric motor 236 that is drivingly connected to an electric motor output shaft 238. Drivingly connected to an end of the electric motor output shaft 238 opposite the electric motor 236 is a gear assembly 240. The gear assembly 240 is a system of gears (not shown) that reduces the overall rotational speed and increases the torque generated by the electric motor 236 of the rear axle modular electric axle head assembly 232.

Drivingly connected to an end of the gear assembly 240 opposite the electric motor 236 is a rear axle differential 242 of the rear axle system 234 of the vehicle 200. The rear axle differential 242 is a set of gears that allows the outer drive wheel(s) of a vehicle 200 to rotate at a faster rate than the inner drive wheel(s). The rotational power is transmitted through the rear axle system 234 as described in more detail below.

The rear axle system 234 further includes the use of a first rear axle half shaft 244 and a second rear axle half shaft 246. A first end portion 248 of the first rear axle half shaft 244 is drivingly connected to a first rear axle wheel assembly 250 and a second end portion 252 of the first rear axle half shaft 244 is drivingly connected to a side of the rear axle differential 242. As a non-limiting example, the second end portion 252 of the first rear axle half shaft 244 is drivingly connected to a rear axle differential side gear, a separate stub shaft, a separate coupling shaft, a first rear axle differential output shaft, a first rear axle half shaft disconnect system and/or a shaft that is formed as part of a rear axle differential side gear.

A first end portion 254 of the second rear axle half shaft 246 is drivingly connected to a second rear axle wheel assembly 256. As illustrated in FIG. 1 of the disclosure, a second end portion 258 of the second rear axle half shaft 246 is drivingly connected to a side of the rear axle differential 242 opposite the first rear axle half shaft 246. As a non-limiting example, the second end portion 258 of the second rear axle half shaft 246 is drivingly connected to a rear axle differential side gear, a separate stub shaft, a separate coupling shaft, a second rear axle differential output shaft, a second rear axle half shaft disconnect system and/or a shaft that is formed as part of a rear axle differential side gear.

Figure 5:
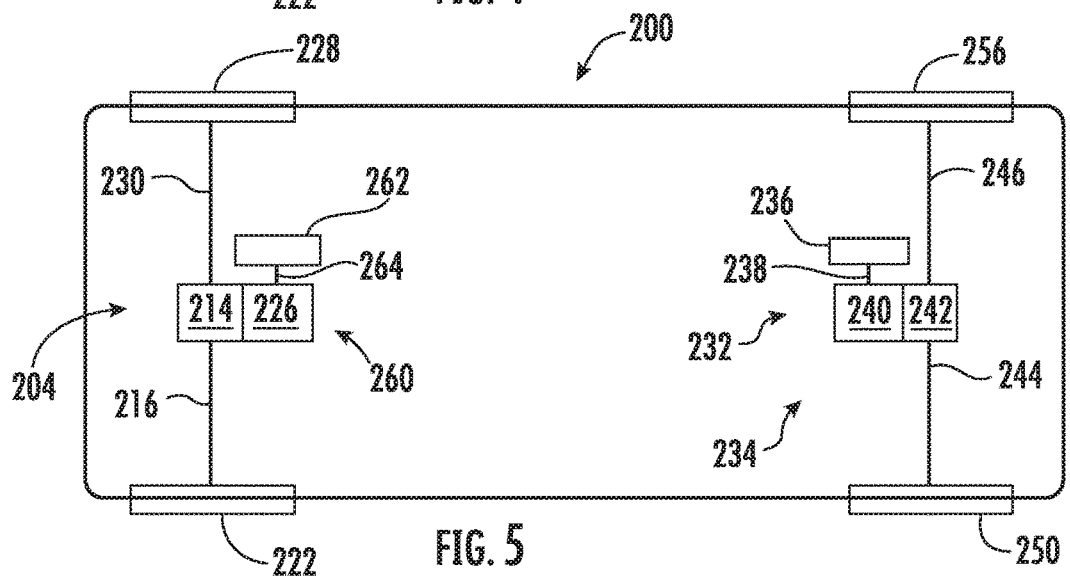
FIG. 5 is a schematic top-plan view of the vehicle illustrated in FIG. 4 having one or more modular electric axle head assemblies according to an embodiment of the disclosure.

FIG. 5 is a schematic top-plan view of the vehicle 200 illustrated in FIG. 4 having one or more modular electric axle head assemblies according to an embodiment of the disclosure. The vehicle 200 illustrated in FIG. 5 of the disclosure is the same as the vehicle 200 illustrated in FIG. 4, except where specifically noted below. As illustrated in FIG. 5 of the disclosure, the vehicle 200 does not include the engine 202 illustrated in FIG. 4. In accordance with this embodiment of the disclosure, the vehicle 200 is an electric drive vehicle.

Drivingly connected to the front axle differential 214 of the front axle system 204 of the vehicle 200 is a front axle modular electric axle head assembly 260 according to an embodiment of the disclosure. The front axle modular electric axle head assembly 260 provides the rotational power necessary to drive the front axle system 204 of the vehicle 200.

The front axle modular electric axle head assembly 260 includes an electric motor 262 that is drivingly connected to an electric motor output shaft 264. Drivingly connected to an end of the electric motor output shaft 264 opposite the electric motor 262 is a gear assembly 266. The gear assembly 266 is a system of gears (not shown) that reduces the overall rotational speed and increases the torque generated by the electric motor 262 of the front axle modular electric axle head assembly 260. Drivingly connected to an end of the gear assembly 266 of the front axle modular electric axle head assembly 260 opposite the electric motor 262 is the front axle differential 214 of the front axle system 204.

Figure 6A:
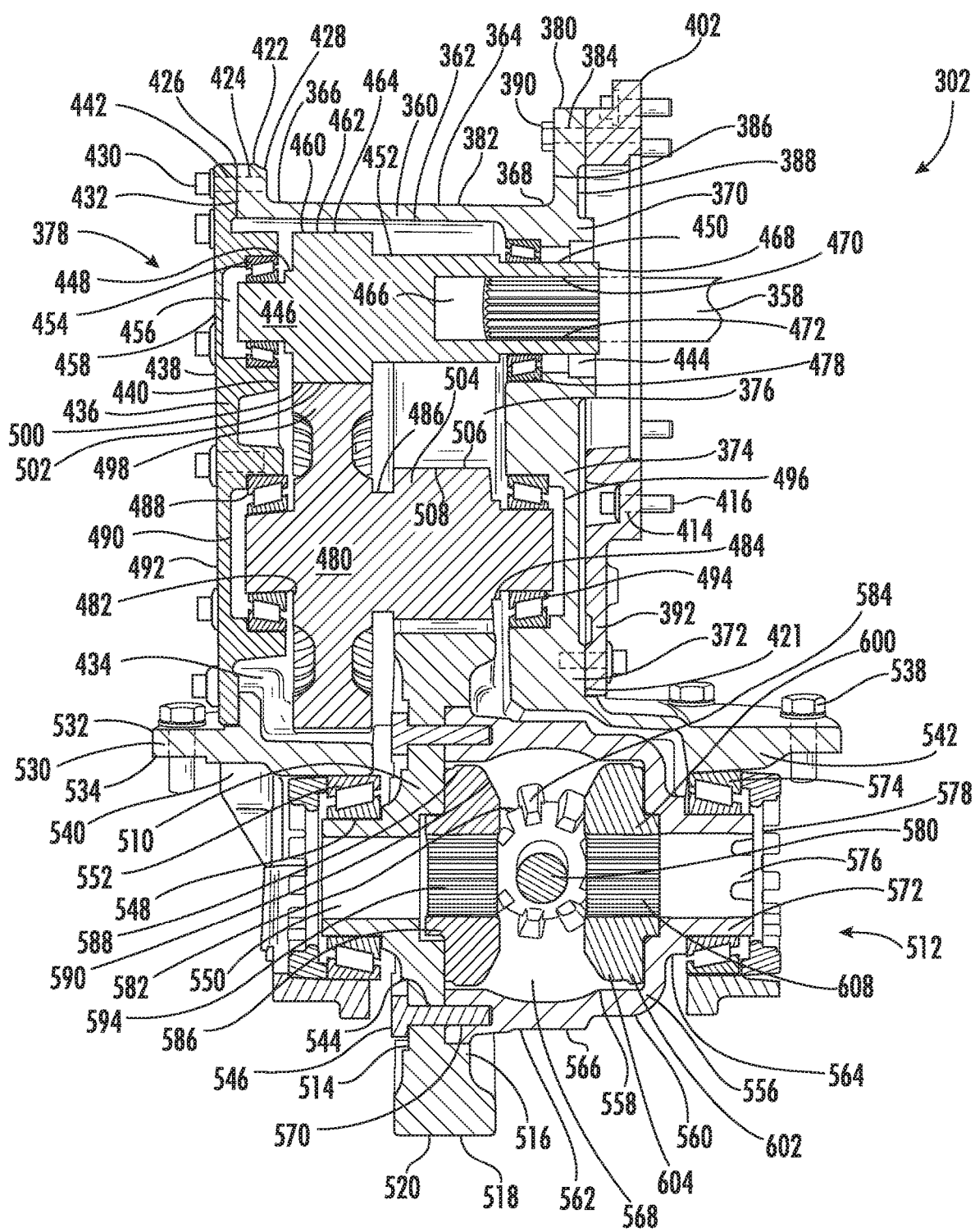
FIG. 6A is a cut-away schematic top-plan view of the modular electric axle head assembly according to the embodiment of the disclosure illustrated in FIG. 6.
Figure 6B:
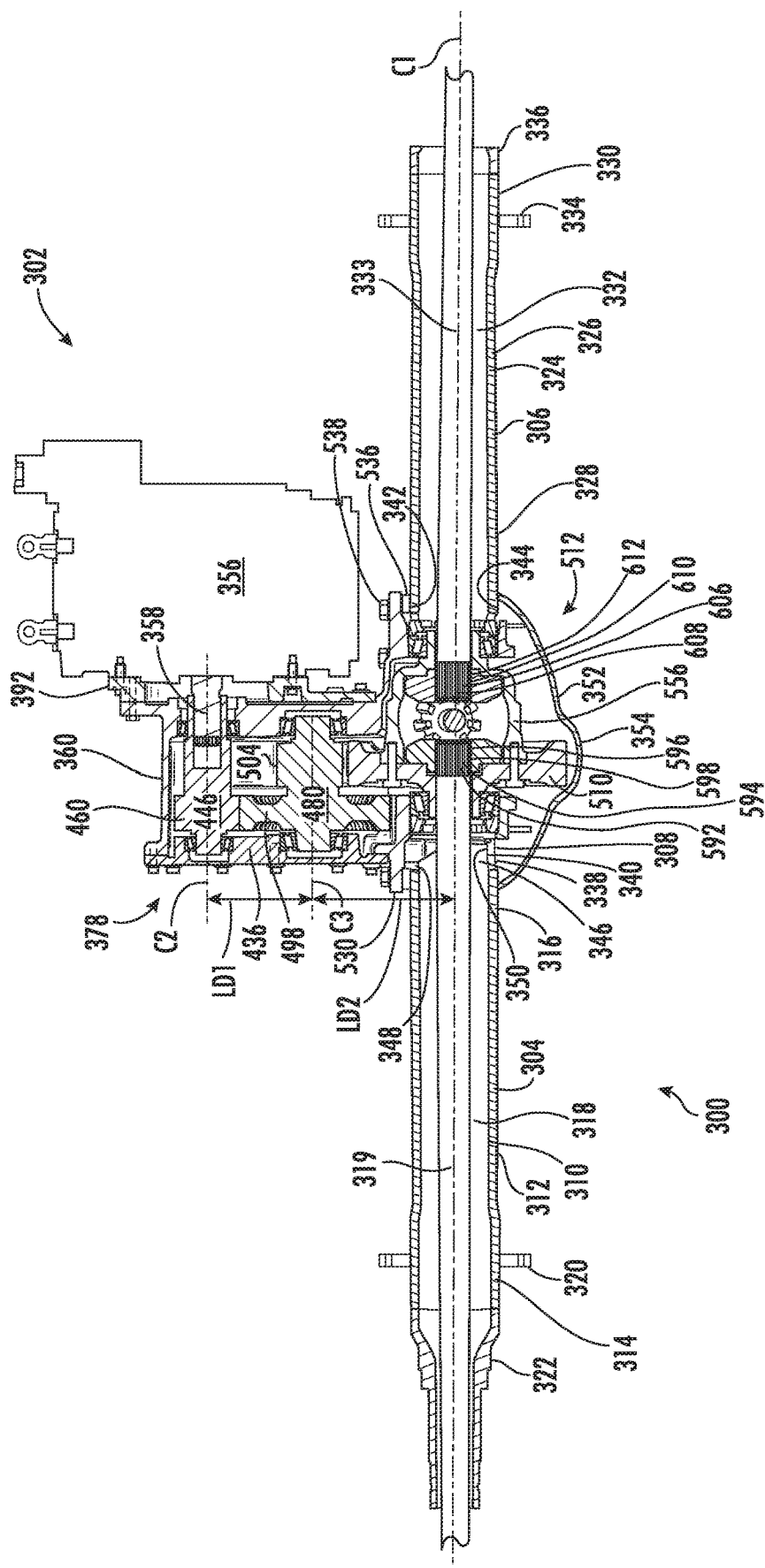
FIG. 6B is a cut-away schematic top-plan view of the electric axle with the modular electric axle head assembly according to the embodiment of the disclosure illustrated in FIGS. 6 and 6A.
Figure 6E:
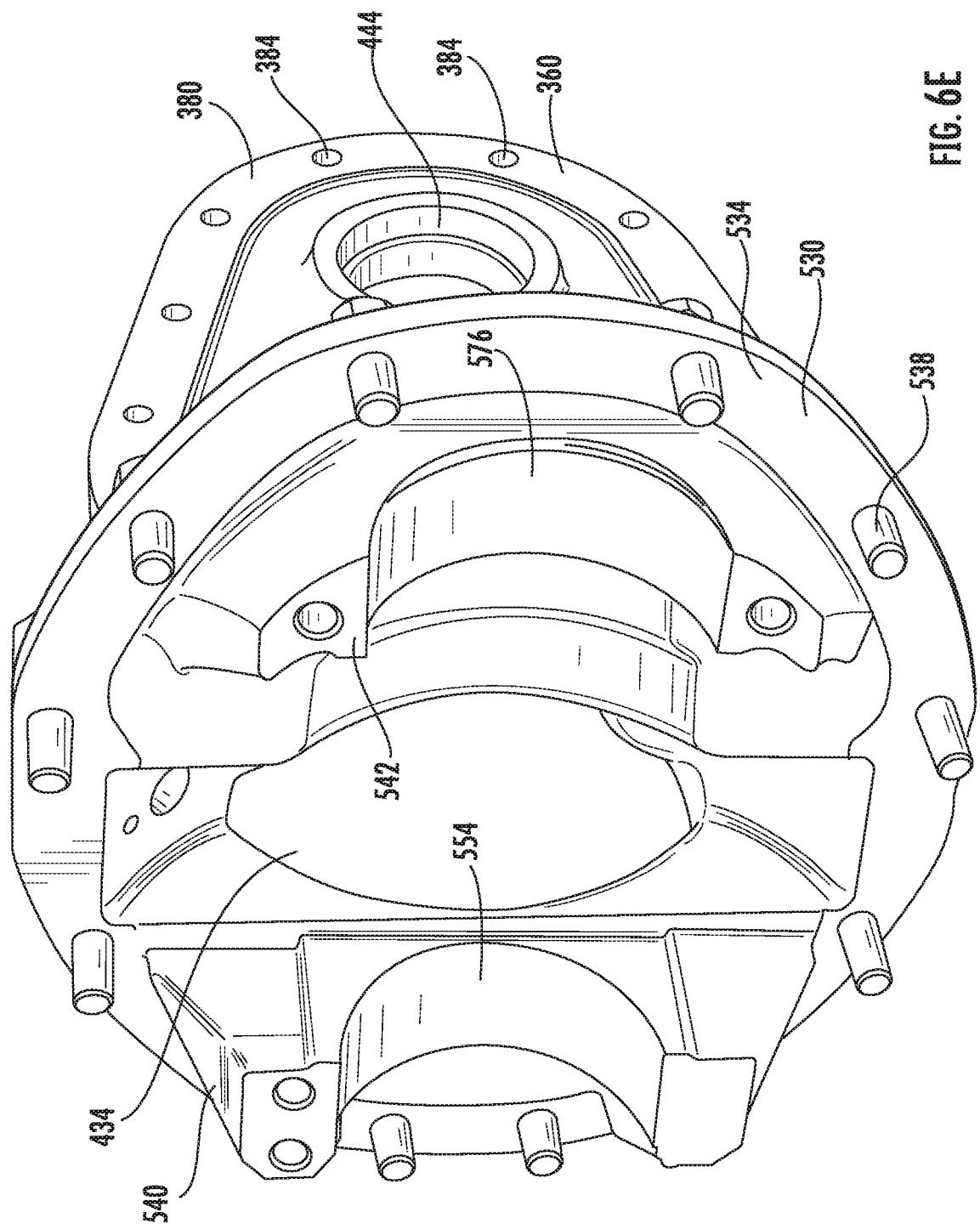
FIG. 6E is a schematic perspective view of a portion of the modular electric axle head assembly according to the embodiment of the disclosure illustrated in FIGS. 6-6D.
Figure 6F:
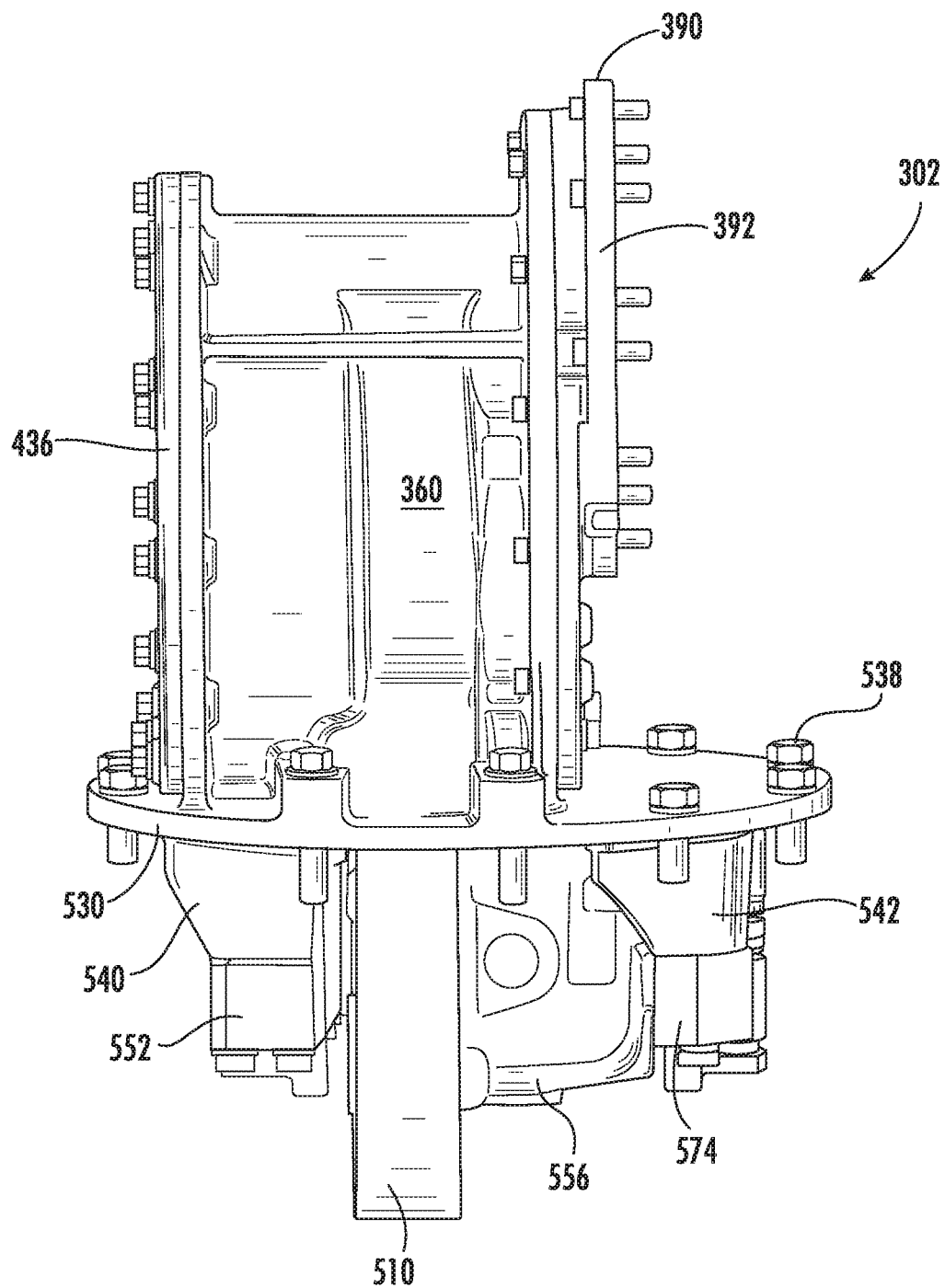
FIG. 6F is a schematic top-plan view of the modular electric axle head assembly according to the embodiment of the disclosure illustrated in FIGS. 6-6E.

FIGS. 6-6F provide a schematic illustration of an axle assembly 300 having a modular electric axle head assembly 302 according to an embodiment of the disclosure. As best seen in FIGS. 6 and 6B of the disclosure, the axle assembly 300 has a first axle half shaft housing 304, a second axle half shaft housing 306 and a banjo portion 308 interposed between the first and second axle half shaft housings 304 and 306. As a non-limiting example, the axle assembly 300 may be a front axle assembly, a rear axle assembly, a forward tandem axle assembly and/or a rear tandem axle assembly. Additionally, it is within the scope of this disclosure and as a non-limiting example, that the axle assembly 300 may be a conventional axle assembly having the modular electric axle head assembly 302.

The first axle half shaft housing 304 has an inner surface 310, an outer surface 312, a first end portion 314 and a second end portion 316. As best seen in FIG. 6B of the disclosure, the inner surface 310 and the outer surface 312 of the first axle half shaft housing 304 defines a hollow portion 318 therein. The hollow portion 318 of the first axle half shaft housing 304 of the axle assembly 300 may have a size and shape to receive at least a portion of a first axle half shaft 319.

Integrally connected to at least a portion of the outer surface 310 of the first end portion 314 of the first axle half shaft housing 304 is a first flange 320. According to an embodiment of the disclosure and as a non-limiting example, the first flange 320 may be integrally connected to the first end portion 314 of the first axle half shaft housing 304 by using one or more adhesives, one or more welds, a threaded connection and/or one or more mechanical fasteners. In accordance with an alternative embodiment of the disclosure and as a non-limiting example, the first flange 320 may be integrally formed as part of the first end portion 314 of the first axle half shaft housing 304.

Disposed outward from the first flange 320 is a first spindle 322. The first spindle 322 provides rotational support for a first wheel end assembly (not shown). As best seen in FIGS. 6 and 6B of the disclosure, the first spindle 322 may be integrally connected to at least a portion of the first end portion 314 of the first axle half shaft housing 304. According to an embodiment of the disclosure and as a non-limiting example, the first spindle 322 may be integrally connected to the first end portion 314 of the first axle half shaft housing 304 by using one or more adhesives, one or more welds, a threaded connection and/or one or more mechanical fasteners. In accordance with an alternative embodiment of the disclosure and as a non-limiting example, the first spindle 322 may be integrally formed as part of the first end portion 314 of the first axle half shaft housing 304.

Integrally connected to at least a portion of the second end portion 316 of the first axle half shaft housing 304 is an end of the banjo portion 308 of the axle assembly 300. It is within the scope of this disclosure and as a non-limiting example, that the second end portion 316 of the first axle housing 304 may form at least a portion of the banjo portion 308 of the axle assembly 300. In accordance with an alternative embodiment of the disclosure and as a non-limiting example, the second end portion 316 of the first axle half shaft housing 304 may be connected to the end of the banjo portion 308 of the axle assembly 300 by using one or more adhesives, one or more welds, a threaded connection and/or one or more mechanical fasteners.

As best seen in FIG. 6B of the disclosure, the second axle half shaft housing 306 has an inner surface 324, an outer surface 326, a first end portion 328 and a second end portion 330. The inner surface 324 and the outer surface 326 of the second axle half shaft housing 306 defines a hollow portion 332 therein. The hollow portion 332 of the second axle half shaft housing 306 of the axle assembly 300 may have a size and shape to receive at least a portion of a second axle half shaft 333.

Integrally connected to at least a portion of the first end portion 328 of the second axle half shaft housing 306 is an end of the banjo portion 308 of the axle assembly 300 opposite the first axle half shaft housing 304. It is within the scope of this disclosure and as a non-limiting example, that the first end portion 328 of the second axle housing 306 may form at least a portion of the banjo portion 308 of the axle assembly 300. In accordance with an alternative embodiment of the disclosure and as a non-limiting example, the first end portion 328 of the second axle half shaft housing 306 may be connected to the end of the banjo portion 308 of the axle assembly 300 opposite the first axle half shaft housing 304 by using one or more adhesives, one or more welds, a threaded connection and/or one or more mechanical fasteners.

At least a portion of a second flange 334 may be integrally connected to at least a portion of the outer surface 324 of the second end portion 330 of the second axle half shaft housing 306 of the axle assembly 300. According to an embodiment of the disclosure and as a non-limiting example, the second flange 334 may be integrally connected to the second end portion 330 of the second axle half shaft housing 306 by using one or more adhesives, one or more welds, a threaded connection and/or one or more mechanical fasteners. In accordance with an alternative embodiment of the disclosure and as a non-limiting example, the second flange 330 may be integrally formed as part of the second end portion 330 of the second axle half shaft housing 306.

Disposed outward from the second flange 334 is a second spindle 336. The second spindle 336 provides rotational support for a second wheel end assembly (not shown). As best seen in FIGS. 6 and 6B of the disclosure, the second spindle 336 may be integrally connected to at least a portion of the second end portion 330 of the second axle half shaft housing 306. According to an embodiment of the disclosure and as a non-limiting example, the second spindle 336 may be integrally connected to the second end portion 330 of the second axle half shaft housing 306 by using one or more adhesives, one or more welds, a threaded connection and/or one or more mechanical fasteners. In accordance with an alternative embodiment of the disclosure and as a non-limiting example, the second spindle 226 may be integrally formed as part of the second end portion 330 of the second axle half shaft housing 306 of the axle assembly 300.

As best seen in FIG. 6B of the disclosure, the banjo portion 308 of the axle assembly 300 has an outer surface 338, an inner surface 340, an inboard side 342 and an outboard side 344. The outer surface 338 and the inner surface 340 of the banjo portion 308 of the axle assembly 300 defines a hollow portion 346 therein. The hollow portion 346 of the banjo portion 308 of the axle assembly 300 may have a size and shape to receive and retain at least a portion of the modular electric axle head assembly 302.

Extending from the outer surface 338 to the inner surface 340 of the inboard side 342 of the banjo portion 308 of the axle assembly 308 is a first opening 348. As best seen in FIG. 6B of the disclosure, the first opening 348 in the inboard side 342 of the banjo portion 308 of the axle assembly 300 may have a size and a shape to receive at least a portion of the modular electric axle head assembly 302.

Additionally, extending from the outer surface 338 to the inner surface 340 of the outboard side 344 of the banjo portion 308 of the axle assembly 300 is a second opening 350. As best seen in FIG. 6 of the disclosure, the second opening 350 in the outboard side 344 of the banjo portion 308 of the axle assembly 300 may have a size and a shape to receive at least a portion of the modular electric axle head assembly 302.

Integrally connected to at least a portion of the outer surface 338 of the outboard side 344 of the banjo portion 308 of the axle assembly 300 is a cover 352. At least a portion of the cover 354 sealingly engages at least a portion of the outer surface 338 of the outboard side 344 of the banjo portion 308 of the axle assembly 300. The sealing engagement between the cover 352 and the outer surface 338 of the outboard side 344 of the banjo portion 308 prevents the migration of dirt, debris and/or moisture into the hollow portion 346 of the banjo portion 308 of the axle assembly 300. It is within the scope of this disclosure and as a non-limiting example, that the axle assembly 300 may further include the use of a gasket (not shown) to aid in facilitating the sealing engagement between the outer surface 338 of the outboard side 344 of the banjo portion 308 and the cover 352 of the axle assembly 300. The gasket (not shown) will fill any gaps between the outer surface 338 of the outboard side 344 of the banjo portion 308 and the cover 352 when assembled. In accordance with an embodiment of the disclosure and as a non-limiting example, the cover 352 may be integrally connected to at least a portion of the outboard side 344 of the banjo portion 308 of the axle assembly 300 by using one or more adhesives, one or more welds, a threaded connection and/or one or more mechanical fasteners.

The cover 352 may have a size and shape to receive at least a portion of the modular electric axle head assembly 302. According to the embodiment of the disclosure illustrated in FIGS. 6 and 6B of the disclosure and as a non-limiting example, the cover 352 may be substantially disk-shaped member having a protruding portion 354.

As best seen in FIGS. 6, 6B, 6C and 6D of the disclosure, the modular electric axle head assembly 302 includes a motor 356 that is drivingly connected to an end of a motor output shaft 358. The motor 356 may be in electrical communication with a source of electrical power (not shown) to provide the rotational power necessary to drive the wheels (not shown) of the axle assembly 300. As a non-limiting example that the motor 356 may be an electric motor or any other device that is able to convert an amount of electrical energy into an amount of mechanical energy.

It is within the scope of this disclosure and as a non-limiting example that the motor 356 may be capable of acting as a generator when not providing the rotations power needed to drive the modular electric axle had assembly 302. As a result, it is to be understood that the power generated by the motor 356 when acting as a generator may be stored for later use.

Integrally connected to at least a portion of the outer surface 338 of the inboard side 342 of the banjo portion 308 of the axle assembly 300 is a gear assembly housing 360 having an inner surface 362, an outer surface 364, a first end portion 366, a second end potion 368, an inboard portion 370, an outboard portion 372 and an intermediate portion 374 interposed between the inboard and outboard portions 370 and 372 of the gear assembly housing 360. As best seen in FIGS. 6A and 6B of the disclosure, the inner surface 362 and the outer surface 364 of the gear assembly housing 360 defines a hollow portion 376 therein. The hollow portion 376 of the gear assembly housing 360 may have a size and a shape to receive and retain at least a portion of a gear assembly 378. In accordance with an embodiment of the disclosure and as a non-limiting example, the hollow portion 376 of the gear assembly housing 360 may have a substantially triangular cross-sectional shape.

A flange portion 380 extends outward from at least a portion of the outer surface 364 of the second end portion 368 of the inboard portion 370 of the gear assembly housing 360. The flange portion 380 second end portion 368 of the gear assembly housing 360 has one or more apertures 384 extending from a first end 386 to a second end 388 of the flange portion 308 of the gear assembly housing 360. As best seen in FIG. 6A of the disclosure, the one or more apertures 384 of the flange portion 380 of the second end portion 368 of the gear assembly housing 360 are of a size and shape to receive and/or retain one or more mechanical fasteners 390. It is therefore within the scope of this disclosure and as a non-limiting disclosure that the one or more apertures 382 may have a plurality of axially extending threads (not shown) that are complementary to a plurality of axially extending threads (not shown) on the one or more mechanical fasteners 390. According to an embodiment of the disclosure and as a non-limiting example, the flange portion 380 of the second end portion 368 of the gear assembly housing 360 may be substantially triangular in shape.

Interposed between the gear assembly housing 360 and the motor 356 is a motor mounting member 392. As best seen in FIGS. 6C and 6D of the disclosure, the motor mounting member 392 has a first side 394, a second side 396, an inboard portion 398 and an outboard portion 400. The motor mounting member 392 may be a modular member having a size and shape to needed to mount the motor 356 to at least a portion of the second end portion 368 of the gear assembly housing 360 of the modular electric axle head assembly 302. It is within the scope of this disclosure, that the shape of the motor mounting member 392 may change depending on the type of motor used and the shape of the motor used in the modular electric axle head assembly 302. As a non-limiting example and as best seen in FIGS. 6C and 6D of the disclosure, the motor mounting member 392 may be substantially triangular in shape having a first substantially straight side 402, a second substantially straight side 404 and a third substantially straight side 406. Additionally, as a non-limiting example and as best seen in FIGS. 6C and 6D of the disclosure and as a non-limiting example, the third substantially straight side 406 of the motor mounting member 392 has an arcuate portion 408 having a radius R1 and extending into the motor mounting member 392.

According to the embodiment of the disclosure illustrated in FIGS. 6-6D and 6F and as a non-limiting example, a motor mounting portion 410 extends outward from at least a portion of the second side 396 of the motor mounting member 392. It is within the scope of this disclosure and as a non-limiting example that the motor mounting portion 410 may have a substantially cylindrical shape that is complementary to a mounting portion 412 of the motor 356.

Extending from a first side 394 to a second side 396 of the motor mounting portion 410 of the motor mounting member 392 is a motor mounting member opening 415. It is within the scope of this disclosure and as a non-limiting example that the motor mounting member opening 415 may have a size and a shape to receive at least a portion of the motor output shaft 358 of the motor 356.

Additionally, extending from a first side 394 to a second side 396 of the motor mounting portion 410 of the motor mounting member 392 is one or more motor attachment apertures 414. As best seen in FIGS. 6c and 6D of the disclosure and as a non-limiting example, the one or more motor attachment apertures 414 of the motor mounting portion 410 of the motor mounting member 392 are disposed circumferentially along the outer periphery of the motor mounting member 392. The one or more motor attachment apertures 414 are of a size and a shape to receive and/or retain one or more mechanical fasteners 416. It is therefore within the scope of this disclosure and as a non-limiting disclosure that the one or more motor attachment apertures 414 of motor mounting portion 410 may have a plurality of axially extending threads (not shown) that are complementary to a plurality of axially extending threads (not shown) on the one or more mechanical fasteners 416.

In order to secure the motor mounting member 392 to the motor 356, at least a portion of the one or more mechanical fasteners 416 are received and retained within at least a portion of one or more attachment apertures 418. As best seen in FIG. 6D of the disclosure, the one or more attachment apertures 418 in the motor 356 are complementary to the one or more motor attachment apertures 414 in the motor mounting portion 410 of the motor mounting member 392. According to an embodiment of the disclosure and as a non-limiting example, the one or more attachment apertures 418 of the motor 356 have a plurality of axially extending threads (not shown) that are complementary to the plurality of axially extending threads (not shown) on the one or more mechanical fasteners 416.

Extending from the first end side to the second side 396 of the motor mounting member 392 is one or more gear housing attachment apertures 420 that are complementary to the one or more apertures 384 in the flange portion 380 of the second end portion 368 of the gear assembly housing 360. As best seen in FIGS. 6C and 6D of the disclosure and as a non-limiting example, the one or more gear housing attachment apertures 420 are disposed along the outer periphery of the first, second and/or third substantially straight sides 402, 404 and/or 406 of the motor mounting member 392. The one or more gear housing attachment apertures 420 are of a size and shape to receive and retain the one or more mechanical fasteners 390. According to an embodiment of the disclosure and as a non-limiting example, the gear housing attachment apertures 420 of the motor mounting member 392 have a plurality of axially extending threads (not shown) that are complementary to the plurality of axially extending threads (not shown) on the one or more mechanical fasteners 390. When assembled, at least a portion of the first side 394 of the motor mounting member 392 may be in direct contact with at least a portion of a second end 421 of the gear assembly housing 360 of the modular electric axle head assembly 302.

A flange portion 422 extends outward from at least a portion of the outer surface 364 of the first end portion 366 of the gear assembly housing 360. The flange portion 422 first end portion 366 of the gear assembly housing 360 has one or more apertures 424 extending from a first end 426 to a second end 428 of the flange portion 422 of the gear assembly housing 360. As best seen in FIG. 6A of the disclosure, the one or more apertures 424 of the flange portion 422 of the first end portion 366 of the gear assembly housing 360 are of a size and shape to receive and retain one or more mechanical fasteners 430. It is therefore within the scope of this disclosure and as a non-limiting disclosure that the one or more apertures 424 may have a plurality of axially extending threads (not shown) that are complementary to a plurality of axially extending threads (not shown) on the one or more mechanical fasteners 430. In accordance with an embodiment of the disclosure and as a non-limiting example, the flange portion 422 of the first end portion 366 of the gear assembly housing 360 may be substantially triangular in shape.

Extending from the inner surface 362 to the outer surface 364 of a first end 432 of the gear assembly housing 360 is an opening 434. The opening 434 in the first end 432 of the gear assembly housing 360 has a size and shape necessary to facilitate the assembly of the gear assembly 378 within the hollow portion 376 of the gear assembly housing 360.

Disposed outward from at least a portion of the first end 432 of the gear assembly housing 360 is a gear housing cover 436 having a first side 438 and a second side 440. The gear housing cover 436 may have a size and shape needed to seal the opening 434 of the first end 432 of the gear assembly housing 360 from the migration of first, debris and/or moisture into the hollow portion 376 of the gear assembly housing 360. Additionally, the gear housing cover 436 may be selectively removable providing access to the gear assembly 378 to make repairs, replacements and/or modifications to one or more of the components of the modular electric axle head assembly 302. In accordance with an embodiment of the disclosure and as a non-limiting example, the gear housing cover 436 may have a shape that is complementary to the flange portion 422 of the first end portion 366 of the gear assembly housing 360. It is therefore within the scope of this disclosure and as a non-limiting example, that the gear housing cover 436 may have a substantially triangular shape.

Extending from the first side 438 to the second side 440 of the gear housing cover 436 is one or more apertures 442 that are complementary to the one or more apertures 424 in the flange portion 422 of the first end portion 366 of the gear assembly housing 360. As best seen in FIG. 6A of the disclosure and as a non-limiting example the one or more apertures 442 of the gear housing cover 436 are disposed along the outer periphery of the gear housing cover 436. The one or more apertures 442 of the gear housing cover 436 are of a size and shape to receive and/or retain the one or more mechanical fasteners 430. It is therefore within the scope of this disclosure and as a non-limiting example, the one or more apertures 442 of the gear housing cover 436 may include a plurality of axially extending threads (not shown) that are complementary to the plurality of axially extending threads (not shown) on the one or more mechanical fasteners 430. When assembled, at least a portion of the second side 440 of the gear housing cover 436 may be in direct contact with at least a portion of the first end 432 of the gear assembly housing 360 of the modular electric axle head assembly 302.

A motor output shaft opening 444 extends from the outer surface 364 to the inner surface 362 of the second end 421 of the gear assembly housing 360. The motor output shaft opening 444 may have a size and a shape needed to receive and/or retain at least a portion of the motor output shaft 358 of the motor 356.

Extending co-axially and drivingly connected with the motor output shaft 358 of the motor 356 is a first gear shaft 446 having a first end portion 448, a second end portion 450 and an outer surface 452. As best seen in FIGS. 6A and 6B of the disclosure, at least a portion of the first end portion 448 of the first gear shaft 446 may be received within one or more first bearing assemblies 454 disposed within a first receiving portion 456 in an outboard portion 458 of the second side 440 of the gear housing cover 436. As a non-limiting example, the one or more first bearing assemblies 454 may be one or more tapered roller bearings, one or more rolling element bearings, one or more needle bearings, one or more magnetic bearings and/or one or more bushings.

Connected to at least a portion of the outer surface 452 of the first end portion 448 of the first gear shaft 446 is a first gear 460. Circumferentially extending from at least a portion of an outer surface 462 of the first gear 460 is a plurality of first gear teeth 464. According to an embodiment of the disclosure and as a non-limiting example, the first gear 460 may be integrally formed as part of the first end portion 448 of the first gear shaft 446. In accordance with an alternative embodiment of the disclosure and as a non-limiting example, the first gear 460 may be integrally connected to at least a portion of the first end portion 448 of the first gear shaft 446 by using one or more adhesives, one or more mechanical fasteners, one or more welds, a threaded connection and/or a splined connection. It is within the scope of this disclosure and as a non-limiting example that the first gear 460 may be a first reduction gear for the gear assembly 378 of the modular electric axle head assembly 302. As a non-limiting example, the plurality of first gear teeth 464 extending from the outer surface 462 of the first gear 460 may be a plurality of hypoid gear teeth, spiral bevel gear teeth, helical gear teeth, spur gear teeth, double hypoid gear teeth, double spiral bevel gear teeth or double helical gear teeth.

As illustrated in FIGS. 6A and 6B of the disclosure, at least a portion of the second end portion 450 of the first gear shaft 446 has a hollow interior portion 466 extending inward from a second end 468 of the first gear shaft 446. The hollow interior portion 466 of the second end portion 450 of the first gear shaft 446 may have a size and shape needed to receive and/or retain at least a portion of the motor output shaft 358. In accordance with an alternative embodiment of the disclosure (not shown), the second end portion of the first gear shaft may be connected to at least a portion of the motor output shaft of the motor by using one or more adhesives, one or more mechanical fasteners, one or more welds, a threaded connection and/or a splined connection.

Circumferentially extending along at least a portion of an inner surface 470 defining the hollow interior portion 466 of the second end portion 450 of the first gear shaft 446 is a plurality of axially extending splines 472. The plurality of axially extending splines 472 are complementary to and meshingly engaged with a plurality of axially extending splines 474 on an outer surface 476 of the motor output shaft 358. The meshing engagement of the plurality of axially extending splines 472 and 474 of the first gear shaft 446 and the motor output shaft 358 rotationally fixes the first gear shaft 446 to the motor output shaft 358.

In accordance with the embodiment of the disclosure illustrated in FIGS. 6A and 6B of the disclosure, at least a portion of the second end portion 450 of the first gear shaft 466 may be received within one or more second bearing assemblies 478 in the motor output shaft opening 444 of the second end 421 of the gear assembly housing 360. As a non-limiting example, the one or more second bearing assemblies 478 may be one or more tapered roller bearings, one or more rolling element bearings, one or more needle bearings, one or more magnetic bearings and/or one or more bushings.

Extending parallel with the first gear shaft 446 and the motor output shaft 358 of the modular electric axle head assembly 302 is a second gear shaft 480 having a first end portion 482, a second end portion 484 and an outer surface 486. As best seen in FIGS. 6A and 6B of the disclosure, at least a portion of the first end portion 482 of the second gear shaft 480 may be received within one or more third bearing assemblies 488 disposed within a second receiving portion 490 in an outboard portion 492 of the second side 440 of the gear housing cover 436. Additionally, as best seen in FIGS. 6A and 6B of the disclosure, at least a portion of the second end portion 484 of the second gear shaft 480 may be received within one or more fourth bearing assemblies 494 disposed within a receiving portion 496 in the inner surface 362 of the outboard portion 372 of the second end portion 368 of the gear assembly housing 360. As a non-limiting example, the one or more bearing assemblies 488 and 494 of the modular electric axle head assembly 302 may be one or more tapered roller bearings, one or more rolling element bearings, one or more needle bearings, one or more magnetic bearings, one or more cylindrical roller bearings and/or one or more bushings.

As best seen in FIG. 6B of the disclosure and as a non-limiting example, the first and second axle half shafts 319 and 333 have a centerline C1, the first gear shaft 446 has a centerline C2 and the second gear shaft 480 has a centerline C3. It is within the scope of this disclosure and as a non-limiting example that a linear distance LD1 between the centerline C2 of the first gear shaft 446 and the centerline C3 of the second gear shaft 480 may be less than a linear distance LD2 between the centerline C3 of the second gear shaft 480 and the centerline C1 of the first and second axle half shafts 319 and 333.

Connected to at least a portion of the outer surface 486 of the first end portion 482 of the second gear shaft 480 is a second gear 498. Circumferentially extending from at least a portion of an outer surface 500 of the second gear 498 is a plurality of second gear teeth 502 that are complementary to and meshingly engaged with the plurality of first gear teeth 464 on the first gear 460. According to an embodiment of the disclosure and as a non-limiting example, the second gear 498 may be integrally formed as part of the first end portion 482 of the second gear shaft 480. In accordance with an alternative embodiment of the disclosure and as a non-limiting example, the second gear 498 may be integrally connected to, at least a portion of the first end portion 482 of the second gear shaft 480 by using one or more adhesives, one or more mechanical fasteners, one or more welds, a threaded connection and/or a splined connection. It is within the scope of this disclosure and as a non-limiting example that the second gear 498 may be an intermediate gear for the gear assembly 378. As a non-limiting example, the plurality of second gear teeth 502 extending from the outer surface 500 of the second gear 498 may be a plurality of hypoid gear teeth, spiral bevel gear teeth, helical gear teeth, spur gear teeth, double hypoid gear teeth, double spiral bevel gear teeth or double helical gear teeth.

Connected to at least a portion of the second end portion 484 of the second gear shaft 480 is a third gear 504. Circumferentially extending from at least a portion of an outer surface 506 of the third gear 504 is a plurality of third gear teeth 508. According to an embodiment of the disclosure and as a non-limiting example, the third gear 504 may be integrally formed as part of the second end portion 484 of the second gear shaft 480. In accordance with an alternative embodiment of the disclosure and as a non-limiting example, the third gear 504 may be integrally connected to at least a portion of the second end portion 484 of the second gear shaft 480 by using one or more adhesives, one or more mechanical fasteners, one or more welds, a threaded connection and/or a splined connection. It is within the scope of this disclosure and as a non-limiting example that the third gear 504 of the gear assembly 378 may be a second reduction gear. As a non-limiting example, the plurality of third gear teeth 508 extending from the outer surface 506 of the third gear 504 may be a plurality of hypoid gear teeth, spiral bevel gear teeth, helical gear teeth, spur gear teeth, double hypoid gear teeth, double spiral bevel gear teeth or double helical gear teeth.

Meshingly engaged with at least a portion of the third gear 504 is a differential ring gear 510 of a differential assembly 512. As best seen in FIGS. 6A and 6B of the disclosure, the differential ring gear 510 has a first side 514, a second side 516 and an outer surface 518. Circumferentially extending along at least a portion of the outer surface 518 of the differential ring gear 510 is a plurality of ring gear teeth 520 that are complementary to and meshingly engaged with the plurality of third gear teeth 508 on the outer surface 506 of the third gear 504. It is within the scope of this disclosure and as a non-limiting example, the plurality of gear ring teeth 520 extending from the outer surface 518 of the differential ring gear 510 may be a plurality of hypoid gear teeth, spiral bevel gear teeth, helical gear teeth, spur gear teeth, double hypoid gear teeth, double spiral bevel gear teeth or double helical gear teeth.

Circumferentially extending from at least a portion of the outer surface 364 of the outboard portion 372 of the gear assembly housing 360 is an axle assembly mounting flange 530 having an inboard portion 532 and an outboard portion 534. The axle assembly mounting flange 530 may have a size and shape needed to sealingly engage with the first opening 348 in the inboard side 342 of the banjo portion 308 of the axle assembly 300. The sealing engagement between the axle assembly mounting flange 530 and the outer surface 338 of the inboard side 342 of the banjo portion 308 prevents the migration of dirt, debris and/or moisture into the hollow portion 346 of the banjo portion 308 of the axle assembly 300. It is within the scope of this disclosure and as a non-limiting example, that the axle assembly 300 may further include the use of a gasket or supporting ring 536 to aid in facilitating the sealing engagement between the outer surface 338 of the banjo portion 308 and the outboard portion 534 of the axle assembly mounting flange 530. The gasket or supporting ring 536 will fill any gaps between the outer surface 338 of the inboard side 342 of the banjo portion 308 and outboard portion 534 of the axle assembly mounting flange 530 when assembled. In accordance with an alternative embodiment of the disclosure and as a non-limiting example, the axle assembly mounting flange 530 may be integrally connected to at least a portion of the inboard side 342 of the banjo portion 308 by using one or more mechanical fasteners 538. According to an alternative embodiment of the disclosure (not shown) and as a non-limiting example, at least a portion of the outboard portion 534 of the axle assembly mounting flange 530 may be integrally connected to at least a portion of the inboard side 342 of the banjo portion 308 by using one or more adhesives, one or more welds and/or a threaded connection. It is within the scope of this disclosure that the one or more adhesives, one or more welds and/or a threaded connection may be used in combination with or instead of the one or more mechanical fasteners 538.

Extending from at least a portion of the outboard portion 534 of the axle assembly mounting flange 530 of the gear assembly housing 360 is a first protruding portion 540 and a second protruding portion 542. As best seen in FIGS. 6D, 6E and 6F, the first and second protruding portions 540 and 542 of the axle assembly mounting flange 530 of the gear assembly housing 360 are disposed on axially opposing sides of the axle assembly mounting flange 530. The first and second protruding portions 540 and 542 of the axle assembly mounting flange 530 of the gear assembly housing 360 provide rotational support or at least a portion of the differential assembly 512.

Extending from the first side 514 to the second side 516 of the differential ring gear 510 is one or more apertures 544. The one or more apertures 544 in the differential ring gear 510 are of a size and shape to receive and/or retain at least a portion of one or more mechanical fasteners 546. It is therefore within the scope of this disclosure and as a non-limiting disclosure that the one or more apertures 544 may have a plurality of axially extending threads (not shown) that are complementary to a plurality of axially extending threads (not shown) on the one or more mechanical fasteners 546.

Extending outward from at least a portion of the first side 514 of the differential ring gear 510 is an axially protruding portion 548. As best seen in FIGS. 6A, 6B and 6F of the disclosure, at least a portion of the axially protruding portion 548 may be received within one or more fifth bearing assemblies 552 disposed within an arcuate portion 554 of the first protruding portion 540 of the axle assembly mounting flange 530 of the gear assembly housing 360. As a result, at least a portion of the arcuate portion 554 of the first protruding portion 540 of the axle assembly mounting flange 530 provides rotational support for the axially protruding portion 548 of the differential ring gear 510. It is within the scope of this disclosure and as a non-limiting example that the one or more fifth bearing assemblies 552 may be one or more tapered roller bearings, one or more rolling element bearings, one or more needle bearings, one or more magnetic bearings and/or one or more bushings.

The axially protruding portion 548 of the differential ring gear 510 has a hollow interior portion 550 having a size and shape to receive at least a portion of an end of the first axle half shaft 319. As best seen in FIGS. 6A and 6B of the disclosure and as a non-limiting example, the axially protruding portion 548 and the hollow interior portion 550 of the differential ring gear 510 are substantially cylindrical in shape.

Disposed outward from at least a portion of the second side 516 of the differential ring gear 510 is a differential case 556. As best seen in FIGS. 6A and 6B of the disclosure, the differential case 556 has an inner surface 558, an outer surface 560, a first end portion 562, a second end portion 564 and an intermediate portion 566 disposed between the first and second end portions 562 and 564 of the differential case 556. The inner surface 558 and the outer surface 560 of the differential case 556 defines a hollow interior portion 568 therein. As illustrated in FIGS. 6A and 6B of the disclosure, at least a portion of the first end portion 562 of the differential case 556 may be integrally connected to at least a portion of the second side 516 of the differential ring gear 510. In accordance with an embodiment of the disclosure and as a non-limiting example, the first end portion 562 of the differential case 556 may be integrally connected to the second side 516 of the differential ring gear 510 by receiving and retaining at least a portion of the one or more mechanical fasteners 546 within one or more mechanical fastener receiving portions 570. It is therefore within the scope of this disclosure and as a non-limiting disclosure that the one or more mechanical fastener receiving portions 570 may have a plurality of axially extending threads (not shown) that are complementary to a plurality of axially extending threads (not shown) on the one or more mechanical fasteners 546.

The second end portion 564 of the differential case 556 has a reduced diameter portion 572. As best seen in FIGS. 6A, 6B and 6F of the disclosure, at least a portion of the reduced diameter portion 572 of the differential case 556 may be received within one or more sixth bearing assemblies 574 disposed within an arcuate portion 576 of the second protruding portion 542 of the of the axle assembly mounting flange 530. As a result, at least a portion of the arcuate portion 576 of the second protruding portion 542 of the axle assembly mounting flange 530 provides rotational support for the reduced diameter portion 572 of the differential case 556. In a non-limiting example, the one or more sixth bearing assemblies 574 may be one or more tapered roller bearings, one or more rolling element bearings, one or more needle bearings, one or more magnetic bearings and/or, one or more bushings.

The reduced diameter portion 572 of the differential case 556 has a hollow interior portion 576 having a size and shape to receive at least a portion of an end of the second axle half shaft 333. As best seen in FIGS. 6A and 6B of the disclosure and as a non-limiting example, the reduced diameter portion 572 and the hollow interior portion 576 of the differential case 556 are substantially cylindrical in shape.

The differential assembly 512 further includes one or more spider gears 578 rotatively connected to a cross pin 580. As illustrated in FIGS. 6A and 6B of the disclosure, at least a portion of each end of the cross pin 580 may be integrally connected to the differential case 556 of the differential assembly 512. Circumferentially extending from at least a portion of an outer surface 582 of the one or more spider gears 578 is a plurality of spider gear teeth 584. As a non-limiting example, the plurality of spider gear teeth 584 extending from the outer surface 582 of the one or more spider gears 578 may be a plurality of hypoid gear teeth, spiral bevel gear teeth, helical gear teeth, spur gear teeth, double hypoid gear teeth, double spiral bevel gear teeth or double helical gear teeth.

Drivingly connected to at least a portion of the one or more spider gears 578 is a first side gear 586 of the differential assembly 512. Circumferentially extending from at least a portion of an outer surface 588 of the first side gear 586 is a plurality of first side gear teeth 590 that are complementary to and meshingly engaged with the plurality of spider gear teeth 584 on the outer surface 582 of the one or more spider gears 578.

As best seen in FIGS. 6A and 6B of the disclosure, circumferentially extending from at least a portion of an inner surface 592 of the first side gear 586 is a plurality of axially extending splines 594. The plurality of axially extending splines 594 of the first side gear 586 are complementary to and meshingly engaged with a plurality of axially extending splines 596 on an outer surface 598 of the end first axle half shaft 319 of the axle assembly 300. As a result, the meshing engagement of the plurality of axially extending splines 594 and 596 on the first side gear 586 and the first axle half shaft 319 drivingly connects the first side gear 586 to the first axle half shaft 319.

Drivingly connected to at least a portion of the one or more spider gears 578 is a second side gear 600 of the differential assembly 512. As best seen in FIGS. 6A and 6B of the disclosure, the first and second side gears 586 and 600 are disposed on axially opposing sides of the one or more spider gears 578 of the differential assembly 512. Circumferentially extending from at least a portion of an outer surface 602 of the second side gear 600 is a plurality of second side gear teeth 604 that are complementary to and meshingly engaged with the plurality of spider gear teeth 584 on the outer surface 582 of the one or more spider gears 578.

As best seen in FIGS. 6A and 6B of the disclosure, circumferentially extending from at least a portion of an inner surface 606 of the second side gear 600 is a plurality of axially extending splines 608. The plurality of axially extending splines 608 of the second side gear 600 are complementary to and meshingly engaged with a plurality of axially extending splines 610 on an outer surface 612 of the end second axle half shaft 333 of the axle assembly 300. As a result, the meshing engagement of the plurality of axially extending splines 608 and 610 on the second side gear 600 and the second axle half shaft 333 drivingly connects the second side gear 600 to the second axle half shaft 333.

In accordance with the embodiment of the disclosure illustrated in FIGS. 6A and 6B of the disclosure, when assembled, at least a portion of the first protruding portion 540, the second protruding portion 542, the differential ring gear 510 and the differential assembly 512 is disposed within the hollow portion 346 of the banjo portion 308 of the axle assembly 300.

Figure 7B:
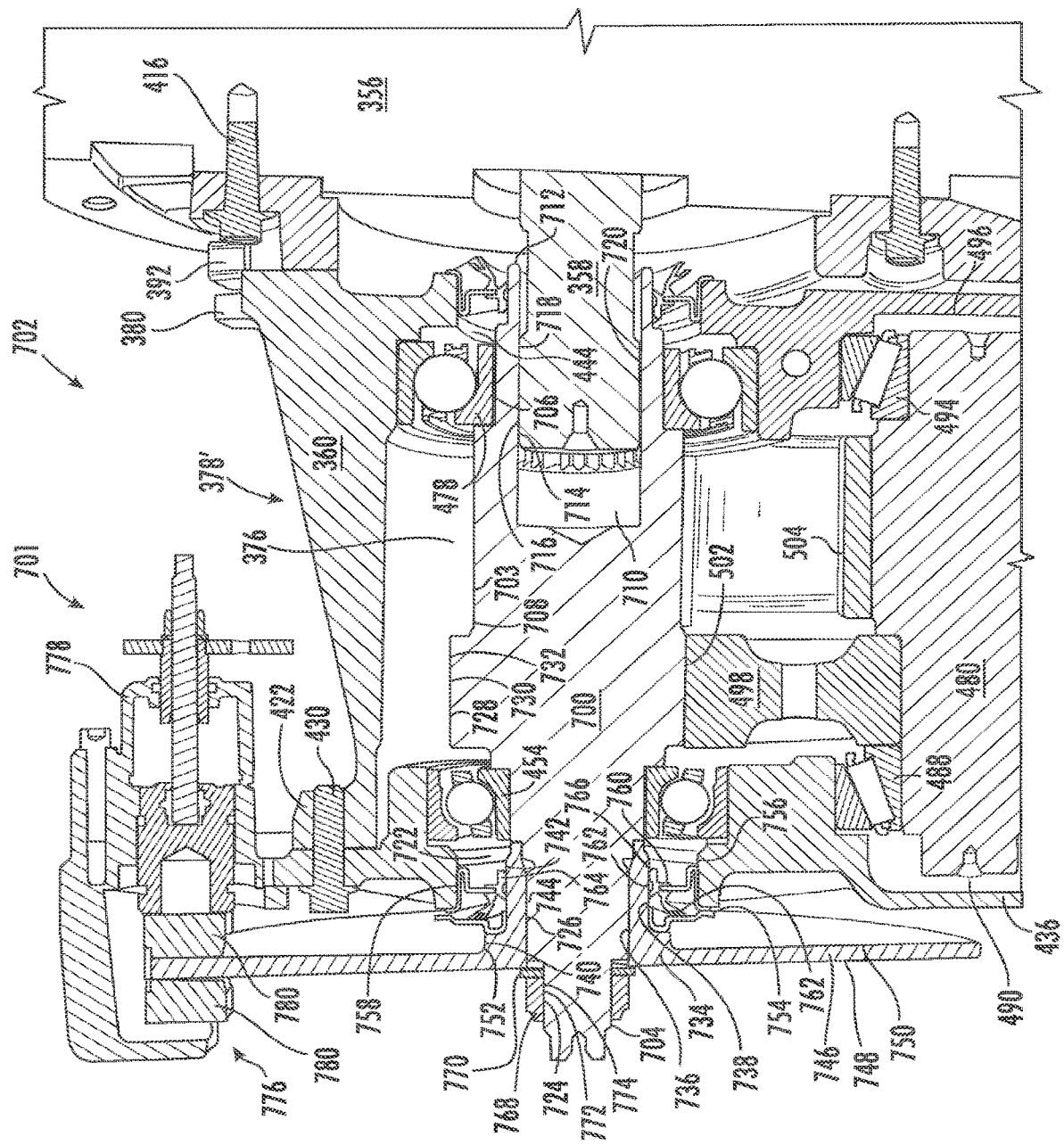
FIG. 7B is a schematic cut-away schematic top-plan view of the modular electric axle head assembly according to the embodiment illustrated in FIGS. 7 and 7A.

FIGS. 7-7B provide a schematic illustration of the axle assembly 300 illustrated in FIGS. 6-6F of the disclosure having a modular electric axle head assembly 702 according to an alternative embodiment of the disclosure. The axle assembly 300 and the modular electric axle head assembly 702 illustrated in FIGS. 7-7B are the same as the axle assembly 300 and the modular electric axle head assembly 302 illustrated in FIGS. 6-6F, except where specifically noted below. In accordance with the embodiment of the disclosure illustrated in FIGS. 7-7b, the modular electric axle head assembly 702 includes the use of a brake assembly 701 that may be integrally connected to at least a portion of an end of a first gear shaft 700.

As best seen in FIG. 7B of the disclosure, the first gear shaft 700 of the modular electric axle head assembly 702 has an outer surface 703, a first end portion 704, a second end portion 706 and an intermediate portion 708 disposed between the first and second end portions 704 and 706 of the first gear shaft 700. The first gear shaft 700 extends co-axially with the motor output shaft 358 and the second gear shaft 480 of the gear assembly 378'.

In accordance with the embodiment of the disclosure illustrated in FIG. 7B, at least a portion of the second end portion 706 of the first gear shaft 700 may be received within the one or more second bearing assemblies 478 disposed within the motor output shaft opening 444 of the second end 421 of the gear assembly housing 360.

At least a portion of the second end portion 706 of the first gear shaft 700 has a hollow interior portion 710 extending inward from a second end 712 of the first gear shaft 700. The hollow interior portion 710 of the second end portion 706 of the first gear shaft 700 may have a size and shape to receive and/or retain at least a portion of the motor output shaft 358 of the motor 356.

Circumferentially extending along at least a portion of an inner surface 714 defining the hollow interior portion 710 of the second end portion 706 of the first gear shaft 700 is a plurality of axially extending splines 716. The plurality of axially extending splines 716 are complementary to and meshingly engaged with a plurality of axially extending splines 718 on an outer surface 720 of the motor output shaft 358. The meshing engagement of the plurality of axially extending splines 716 and 718 of the first gear shaft 700 and the motor output shaft 358 rotationally fixes the first gear shaft 446 to the motor output shaft 358.

As illustrated in FIG. 7B of the disclosure, at least a portion of the first end portion 704 of the first gear shaft 700 extends through an opening 722 extending from a first side 438 to a second side 440 of the outboard portion 458 of the gear housing cover 436. Disposed within the opening 722 of the gear housing cover 436 is the one or more first bearing assemblies 454 having a size and shape to receive and rotationally support at least a portion of the first gear shaft 700.

In accordance with the embodiment of the disclosure illustrated in FIG. 7B, at least a portion of the outer surface 703 of the first end portion 704 of the first gear shaft 700 has a plurality of axially extending threads 724.

Circumferentially extending along at least a portion of the outer surface 703 of the first gear shaft 700 is a plurality of axially extending splines 726. As best seen in FIG. 7B of the disclosure, the plurality of axially extending splines 726 are disposed directly adjacent to the plurality of axially extending threads 724 on the first end portion 704 of the first gear shaft 700. In accordance with an embodiment of the disclosure and as a non-limiting example, at least a portion of the plurality of axially extending splines 726 extend outward from the first side 438 of the gear housing cover 436.

Connected to at least a portion of the outer surface 703 of the intermediate portion 708 of the first gear shaft 700 is a first gear 728. As best seen in FIG. 7B of the disclosure, the first gear 728 may be disposed adjacent to a side of the plurality of splines 726, opposite the plurality of threads 724, on the outer surface 703 of the first gear shaft 700 and within the hollow portion 376 of the gear assembly housing 360. Circumferentially extending from at least a portion of an outer surface 730 of the first gear 728 is a plurality of first gear teeth 732 that are complementary to and meshingly engaged with the plurality of second gear teeth 502 on the second gear 498. According to an embodiment of the disclosure and as a non-limiting example, the first gear 728 may be integrally formed as part of the first gear shaft 700 of the gear assembly 378'. In accordance with an alternative embodiment of the disclosure and as a non-limiting example, the first gear 728 may be integrally connected to at least a portion of the first gear shaft 700 by using one or more adhesives, one or more mechanical fasteners, one or more welds, a threaded connection and/or a splined connection. It is within the scope of this disclosure and as a non-limiting example that the first gear 728 may be a first reduction gear of the gear assembly 378' of the modular electric axle head assembly 702. As a non-limiting example, the plurality of first gear teeth 732 extending from the outer surface 730 of the first gear 728 may be a plurality of hypoid gear teeth, spiral bevel gear teeth, helical gear teeth, spur gear teeth, double hypoid gear teeth, double spiral bevel gear teeth or double helical gear teeth.

Extending co-axially with the first gear shaft 700 is a rotor portion 734 of the brake assembly 701 having an inner surface 736, an outer surface 738, a first end portion 740 and a second end portion 742. As best seen in FIG. 7B of the disclosure, at least a portion of the first end portion 740 of the rotor portion 734 is disposed outside the hollow interior portion 376 of the gear assembly housing 360 of the modular electric axle head assembly 302. Additionally, as best seen in FIG. 7B of the disclosure, at least a portion of the second end portion 742 of the rotor portion 734 is disposed within the hollow interior portion 376 of the gear assembly housing 360.

Circumferentially extending from at least a portion of the inner surface 736 of the rotor portion 734 is a plurality of axially extending splines 744. The plurality of axially extending splines 744 on the inner surface 736 of the rotor portion 734 are complementary to and meshingly engaged with the plurality of axially extending splines 726 on the outer surface 703 of the first end portion 704 of the first gear shaft 700.

As illustrated in FIG. 7B of the disclosure, circumferentially extending from at least a portion of the first end portion 740 of the rotor portion 734 is a first increased diameter portion 746 having a first side 748 and a second side 750. In accordance with the embodiment illustrated in FIG. 7B and as a non-limiting example, at least a portion of the first increased diameter portion 746 of the rotor portion 734 is disposed outside the hollow interior portion 376 of the gear assembly housing 360. It is within the scope of this disclosure and as a non-limiting example that the first increased diameter portion 746 of the rotor portion 734 may be substantially disk-shaped.

Disposed directly adjacent to the second side 750 of the first increased diameter portion 746 of the rotor portion 734 is a second increased diameter portion 752. As it can be seen by referencing FIG. 7B of the disclosure and as a non-limiting example, the second increased diameter portion 752 has an outermost diameter that is less than an outermost diameter of the first increased diameter portion 746 of the rotor portion 734.

Integrally connected to at least a portion of the outer surface 738 of the rotor portion 734 is a first sealing portion 754. In accordance with an embodiment of the disclosure and as a non-limiting example, at least a portion of the first sealing portion 754 may be integrally connected to at least a portion of the outer surface 738 and to at least a portion of the second increased diameter portion 752 of the rotor portion 734. As best seen in FIG. 7B of the disclosure, the first sealing portion 754 is disposed directly adjacent to an end of the second increased diameter portion 752 opposite the first increased diameter portion 746 of the rotor portion 734 of the brake assembly 701. Additionally, as best seen in FIG. 7B of the disclosure, the first sealing portion 754 extends outward from at least a portion of the outer surface 738 of the rotor portion 734 beyond the opening 722 in the outboard portion 458 of the gear housing cover 436. According to an embodiment of the disclosure (not shown), the first sealing portion 754 of the modular electric axle head assembly 702 may be integrally formed as part of the rotor portion 734. In accordance with an alternative embodiment of the disclosure and as a non-limiting example, the first sealing portion 754 may be integrally connected to at least a portion of the outer surface 738 of the brake rotor by using one or more welds, one or more adhesives, one or more mechanical fasteners and/or using a threaded connection.

Integrally connected to at least a portion of an inner surface 756 defining the opening 722 in the outboard portion 458 of the gear housing cover 436 is a second sealing portion 758. As a non-limiting example, at least a portion of the second sealing member 758 may be integrally connected to at least a portion of the inner surface 756 defining the opening 722 in the gear housing cover 436 and to at least a portion of the first side 438 of the gear housing cover 436. As best seen in FIG. 7B of the disclosure, at least a portion of the second sealing portion 758 extends inward from the inner surface 756 of the opening 722 toward the outer surface 738 of the rotor portion 734 of the brake assembly 701.

At least a partially interposed between the second sealing portion 758 and the outer surface 738 of the rotor portion 734 is a sealing member 760 having one or more sealing ribs 762. As best seen in FIG. 7B of the disclosure, at least a portion of the second sealing portion 758 may be received within and sealingly engaged with at least a portion of the sealing member 760 of the modular electric axle head assembly 302. Additionally, as illustrated in FIG. 7B of the disclosure, at least a portion of the one or more sealing ribs 762 are sealingly engaged with at least a portion of the first sealing portion 754 and the rotor portion 734 of the modular electric axle head assembly 302. As a result, the first sealing portion 754, the second sealing portion 758 and the sealing member 760 aid in preventing the migration of dirt, debris and/or moisture into the hollow portion 376 of the gear assembly housing 360 of the modular electric axle head assembly 302.

In accordance with an embodiment of the disclosure and as a non-limiting example, the sealing member 760 further includes one or more ring members 764 that are received within a channel 766 circumferentially extending along at least a portion of one or more of the one or more sealing ribs 762. The one or more ring members 764 provide a radially compressive force to the one or more sealing ribs 762, which aids in providing a sealing engagement between the sealing member 760 and the rotor portion 734 of the modular electric axle head assembly 302. As a result, the one or more ring members 764 further aid in preventing the migration of dirt, debris and/or moisture into the hollow portion 376 of the gear assembly housing 360.

As best seen in FIGS. 7A and 7B of the disclosure and as a non-limiting example, the brake assembly 701 may include the use of a nut 768 and a washer 770 that are disposed directly adjacent to at least a portion of the rotor portion 734 of the brake assembly 701. According to the embodiment illustrated in FIGS. 7A and 7B of the disclosure, at least a portion of the washer 770 is interposed between the nut 768 and the rotor portion 734 of the brake assembly 701. It is within the scope of this disclosure and as a non-limiting example that the washer 770 may be a lock washer or any other type of retention device.

Circumferentially extending format least a portion of an inner surface 772 of the nut 768 is a plurality of axially extending threads 774. As illustrated in FIG. 7B of the disclosure, the plurality of axially extending threads 774 on the inner surface 772 of the nut 768 are complementary to and meshingly engaged with the plurality of axially extending threads 724 on the first end portion 704 of the first gear shaft 700. When assembled, the nut 768 and/or the washer 770 are used to axially restrain the rotor portion 734 onto the first gear shaft 700 of the modular electric axle head assembly 302.

Integrally connected to at least a portion of the flange portion 422 of the first end portion 366 of the gear assembly housing 360 and/or to at least a portion of the gear housing cover 436 of the modular electric axle head assembly 702 is a caliper assembly 776. According to an embodiment of the disclosure and as a non-limiting example, the caliper assembly 776 of the brake assembly 701 may be integrally connected to the flange portion 422 of the gear assembly housing 360 and/or to the gear housing cover 436 by using one or more mechanical fasteners, one or more welds and/or one or more adhesives.

As best seen in FIG. 7B of the disclosure, the caliper assembly 776 includes one or more pistons 778 that are connected to one or more brake pads 780. It is within the scope of this disclosure that the one or more pistons 778 of the brake assembly 701 may be operable via a switch, mechanical linkage, a hydraulic system, a pneumatic system, an electro-mechanical system and/or a hybrid hydraulic-mechanical system. According to an embodiment of the disclosure and as a non-limiting example, the brake assembly 701 of the modular electric axle head assembly 702 may be a floating disk brake assembly or a fixed disk brake assembly. It is within the scope of this disclosure that the brake assembly 701 may function as a parking brake, a parking mechanism, an anti-theft mechanism and/or a service brake. As a result, it is therefore to be understood that the brake assembly 701 may be used alone or in combination with one or more braking assemblies (not shown) located at the first and/or second wheel end assemblies (not shown).

When the one or more pistons 778 are actuated, the one or more brake pads 780 are translated axially toward the first increased diameter portion 746 of the rotor portion 734 till the one or more brake pads 780 are at least variably frictionally engaged with the first increased diameter portion 746 of the rotor portion 734. By selectively frictionally engaging the caliper assembly 776 with the first increased diameter portion 746 of the rotor portion 734, the amount of rotational energy transmitted to the wheels (not shown) of the vehicle (not shown) can be limited. It is therefore within the scope of this disclosure that the brake assembly 701 may be used to aid in slowing down the vehicle (not shown), stopping the vehicle (not shown) and/or preventing the vehicle (not shown) from moving when parked.

In accordance with an embodiment of the disclosure and as a non-limiting example, the brake assembly 701 may further include the use of a braking assembly cover 782. As best seen in FIG. 7 of the disclosure, the braking assembly cover 782 may have a size and shape needed to encase at least a portion of the rotor portion 734 and at least a portion of the caliper assembly 776. The braking assembly cover 782 shields the rotor portion 734 and the caliper assembly 776 from damage due to road debris, loose road materials and/or any other materials that may damage the brake assembly 701 upon impact or may become lodged between the brake pads 780 and the rotor portion 734 inhibiting the function of the brake assembly 701. Additionally, the braking assembly cover 782 shields the rotor portion 734 and the caliper assembly 776 from the accumulation of ice during the winter months which aids in improving the overall performance of the brake assembly 701 in low temperature operating conditions.

According to the embodiment of the disclosure illustrated in FIG. 7, the braking assembly cover 782 may be integrally connected to at least a portion of the flange portion 422 of the gear assembly housing 360 and/or to at least a portion of the gear housing cover 436. As illustrated in FIG. 7 of the disclosure, the braking assembly cover 782 may be integrally connected to at least a portion of a flange portion 784 extending outward from at least a portion of the outboard portion 458 of the gear housing cover 436. The flange portion 784 of the gear housing cover 436 may have a shape that is complementary to the shape of the braking assembly cover 782. As illustrated in FIG. 7 of the disclosure and as a non-limiting example, the flange portion 784 of the gear housing cover 436 may have a substantially circular in shape. In a non-limiting example, the braking assembly cover 782 may be integrally connected to the flange portion 422 of the gear assembly housing 360 and/or to the gear housing cover 436 by using one or more mechanical fasteners, one or more adhesives, one or more welds and/or a threaded connection.

Figure 8:
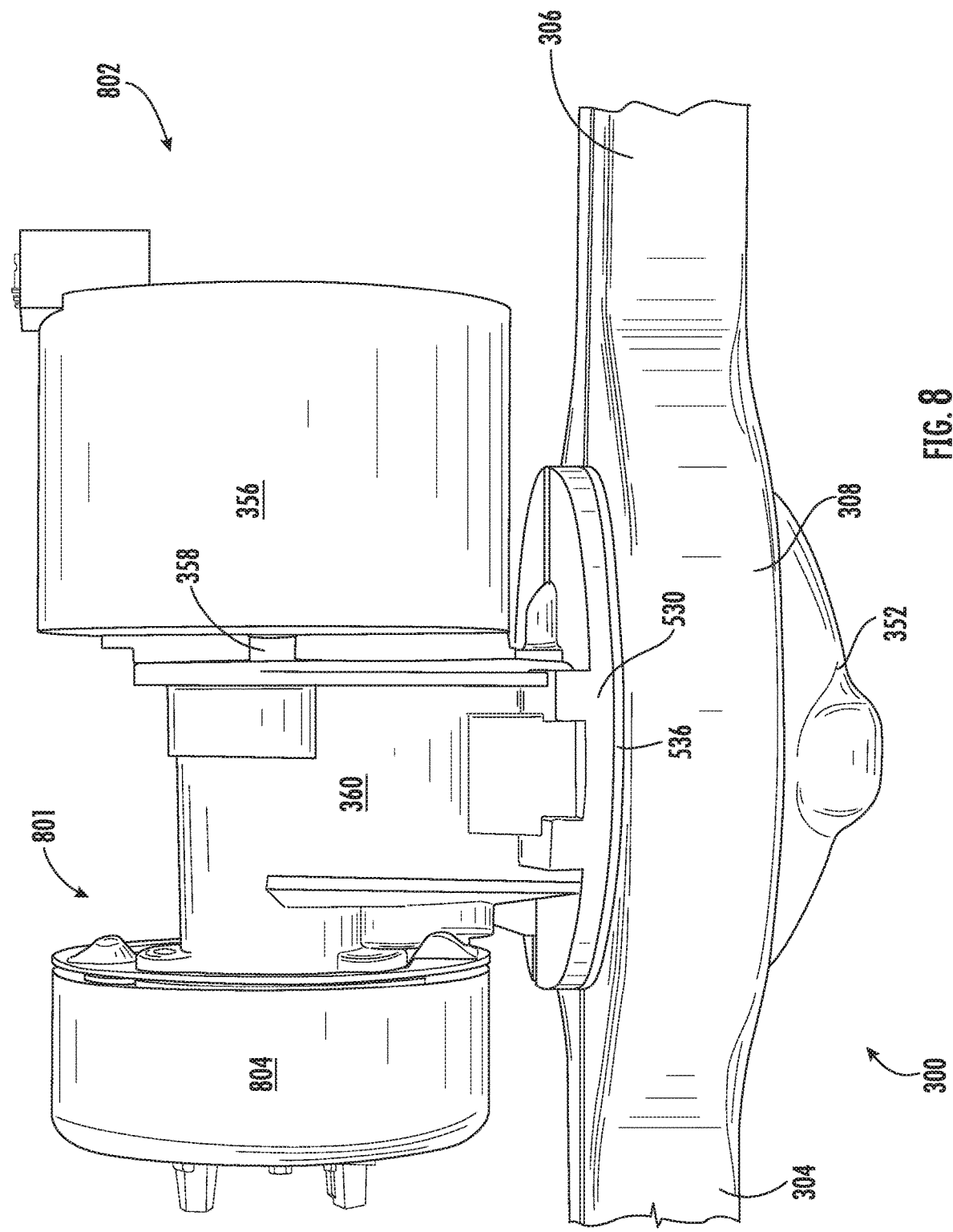
FIG. 8 is a schematic top-plan view of a modular electric axle head assembly according to another embodiment of the disclosure.

FIG. 8 is a schematic top-plan view of the axle assembly 300 illustrated in FIGS. 6-7B of the disclosure having a modular electric axle head assembly 802 according to another embodiment of the disclosure. The axle assembly 300 and modular electric axle head assembly 802 illustrated in FIG. 8 are the same as the axle assembly and modular electric axle head assemblies 302 and 702 illustrated in FIGS. 6-7B, except where specifically noted below. In accordance with the embodiment of the disclosure illustrated in FIG. 8 and as a non-limiting example, the modular electric axle head assembly 802 does not include the use of a brake assembly 701.

As illustrated in FIG. 8 of the disclosure, integrally connected to at least a portion of the first end portion 704 of the first gear shaft 700 is a brake assembly 801.

The brake assembly 801 may include a brake drum 804 that may be integrally connected to at least a portion of the first end portion 704 of the first gear shaft 700. When one or more pistons (not shown) of the brake assembly 801 are actuated, one or more brake pads (not shown) are translated outward to become at least variably frictionally engaged with an interior surface (not shown) of the drum 804 of the brake assembly 801. By selectively frictionally engaging the brake assembly 801 with the first increased diameter portion 746 of the rotor portion 734, the amount of rotational energy transmitted to the wheels (not shown) of the vehicle (not shown) can be reduced and/or eliminated. It is therefore to be understood that the brake assembly 801 may be used to aid in slowing down the vehicle (not shown), stopping the vehicle (not shown) and/or preventing the vehicle (not shown) from moving when parked.

According to an embodiment of the disclosure and as a non-limiting example, the brake assembly 801 may function as a parking brake, a parking mechanism, a service brake and/or an anti-theft mechanism. As a result, it is within the scope of this disclosure that the brake assembly 801 may be used alone or in combination with one or more braking assemblies (not shown) located at the first and/or second wheel end assemblies (not shown).

Figure 9:
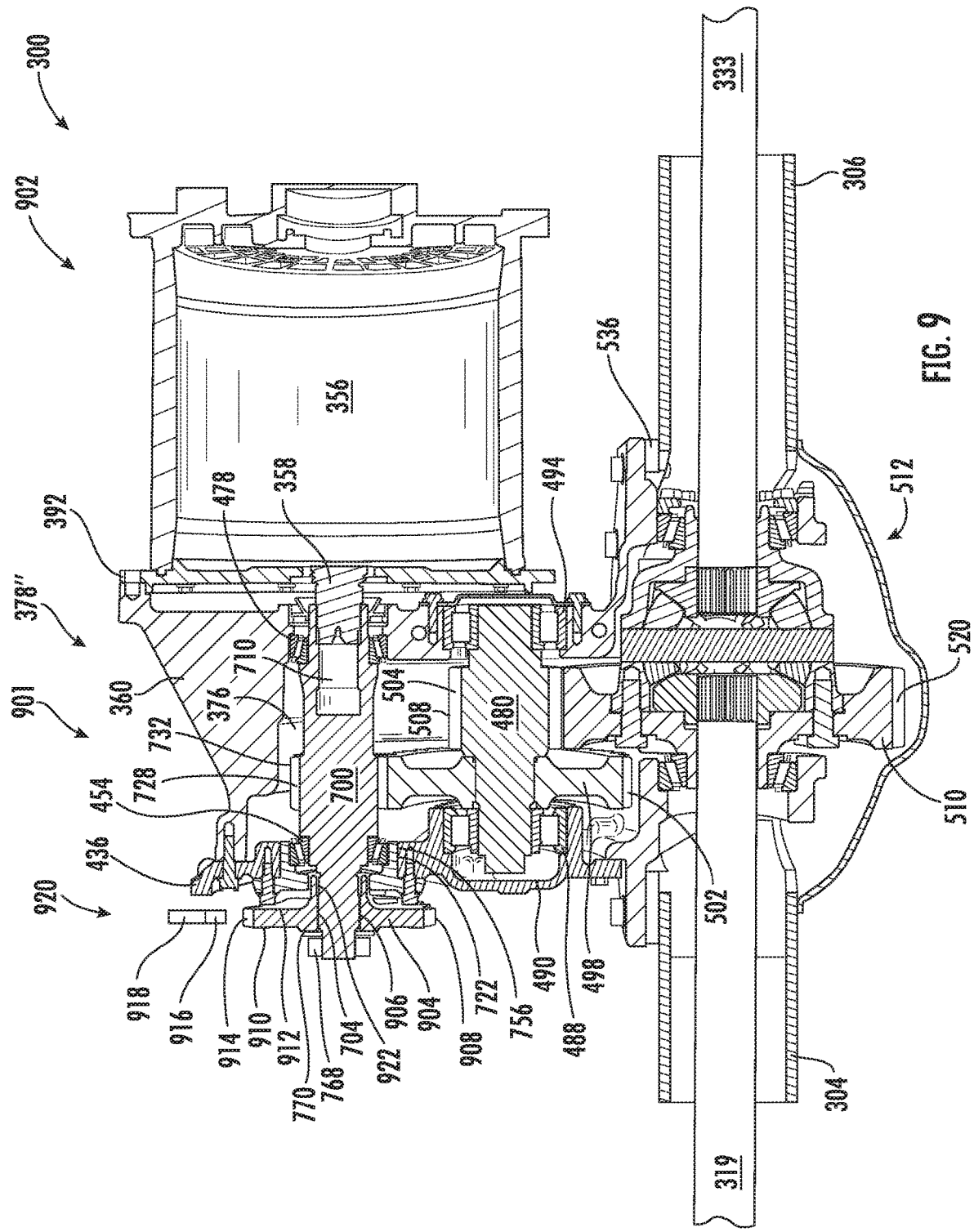
FIG. 9 is a schematic top-plan view of a modular electric axle head assembly according to yet another embodiment of the disclosure.

FIG. 9 is a schematic top-plan view of the axle assembly 300 illustrated in FIGS. 6-8 of the disclosure having a modular electric axle head assembly 902 according to yet another embodiment of the disclosure. The axle assembly 300 and modular electric axle head assembly 902 illustrated in FIG. 9 are the same as the axle assembly and modular electric axle head assemblies 302, 702 and 802 illustrated in FIGS. 6-8, except where specifically noted below. In accordance with the embodiment of the disclosure illustrated in FIG. 9 and as a non-limiting example, the modular electric axle head assembly 902 does not include the use of a brake assemblies 701 and 801 illustrated in FIGS. 7-8 of the disclosure.

Extending co-axially with the first gear shaft 700 of the gear assembly 378" is a parking gear 904 of the brake assembly 901 of the modular electric axle head assembly 902. The parking gear 904 has an inner surface 906, an outer surface 908, a first side 910 and a second side 912. As best seen in FIG. 9 of the disclosure and as a non-limiting example, at least a portion of the parking gear 904 is disposed outside the hollow interior portion 376 of the gear assembly housing 360 and at least a portion of the parking gear 904 is disposed within the hollow interior portion 376 of the gear assembly housing 360 of the gear assembly 378". It is within the scope of this disclosure and as a non-limiting example that the parking gear 904 may be integrally formed as part of the first end portion 704 of the first gear shaft 700 or integrally connected to at least a portion of the first end portion 704 of the first gear shaft 700 by using one or more welds, one or more mechanical fasteners, on or more adhesives, a spline connection and/or a threaded connection.

In accordance with the embodiment illustrated in FIG. 9 and as a non-limiting example, an axially extending portion 922 extends ally outward from at least a portion of the second side 912 of the parking gear 904. As best seen in FIG. 9 of the disclosure and as a non-limiting example, at least a portion of the axially extending portion 922 of the parking gear 904 is disposed within the hollow interior portion 376 of the gear assembly housing 360. It is within the scope of this disclosure and as a non-limiting example that the axially extending portion 922 of the parking gear 904 may aid in sealing the opening 722 in the gear housing cover 436. This aids in preventing the migration of dirt, debris and/or moisture into the gear assembly 378" thereby aiding in improving the overall life and durability of the modular electric axle head assembly 902.

Circumferentially extending from at least a portion of the outer surface 908 of the parking gear 904 is a plurality of parking gear teeth 914. The plurality of parking gear teeth 914 are selectively engagable with at least a portion of one or more teeth 916 on a parking pawl 918. When the parking pawl 918 is in the first position 920 illustrated in FIG. 9 of the disclosure and as a non-limiting example, the one or more teeth 916 of the parking pawl 918 are not meshingly engaged with the plurality of parking gear teeth 914 on the parking gear 904 of the brake assembly 901. As a result, when the parking pawl 918 is in the first position 920, the motor 356 is able to drive the first gear shaft 700 which in turn provides the rotational power needed to drive the first and second axle half shafts 319 and 333 of the axle assembly 300. When the parking pawl 918 is in a second position (not shown) and as a non-limiting example, at least a portion of the one or more teeth 916 of the parking pawl 918 are meshingly engaged with the plurality of parking gear teeth 914 on the parking gear 904. As a result, when the parking pawl 918 is in the second position (not shown) the motor 356 is unable to drive the first gear shaft 700 and therefore cannot provide the rotational power needed to drive the first and second axle half shafts 319 and 333. It is therefore within the scope of this disclosure that the brake assembly 901 may function as an anti-theft mechanism, a parking brake, a parking mechanism and/or a service brake. As a result, the brake assembly 901 may be used alone or in combination with the one or more braking assemblies (not shown) located at the first and/or second wheel end assemblies (not shown).

In order to selectively transition the parking pawl 918 between the first position 920 and the second position (not shown), at least a portion of the parking pawl 918 may be connected to at least a portion of an actuation mechanism (not shown). It is within the scope of this disclosure and as a non-limiting example, that the actuation mechanism (not shown) may be an actuator, a linear actuator, a cam actuation mechanism, an electro-magnetic actuator and/or an electro-mechanical actuation mechanism.

According to an embodiment of the disclosure (not shown) and as a non-limiting example, the brake assembly 901 illustrated in FIG. 9 may be used in place of the brake assemblies 701 and 801 or in combination with either the brake assemblies 701 and 801.

In accordance with the embodiment illustrated in FIG. 9 and as a non-limiting example, the plurality of gear teeth 732, 502 and 508 on the first, second and third gears 728, 498 and 510 may be a plurality of helical gear teeth. The helix angle (not shown) of the plurality of gear teeth 732, 502 and 508 on the first, second and third gears 728, 498 and 510 may be precisely tuned in order to provide the canceling force vectors needed to reduce, minimize or eliminate the amount of axial forces experienced by the second gear shaft 480 and/or the one or more third and fourth bearing assemblies 488 and 494 of the gear assembly 378". As a result, the one or more third and fourth bearing assemblies 488 and 494 may be one or more cylindrical roller bearings. By making the one or more third and fourth bearing assemblies 488 and 494 one or more cylindrical roller bearings, it allows the gear assembly housing 360 to be more compact which reduces the overall weight and improves the packaging of the modular electric axle head assembly 902. This aids in improving the overall energy/fuel efficiency of the vehicle (not shown) and allows the modular electric axle head assembly 902 to be incorporated into a wider array of vehicles. Additionally, by making the one or more third and fourth bearing assemblies 488 and 494 one or more cylindrical roller bearings, it reduces the noise, vibration and harshness (NVH) characteristics, improves the overall manufacturability and reduces the overall manufacturing/assembly costs associated with the modular electric axle head assembly 902. Furthermore, by making the one or more third and fourth bearing assemblies 488 and 494 one or more cylindrical roller bearings, it reduces the overall weight and costs associated with the manufacture/assembly of the modular electric axle head assembly 902 by eliminating the need for and assembly of one or more shims into the modular electric axle head assembly 902.

In order to axially restrain the parking gear 904 on the first gear shaft 700 of the gear assembly 378" the nut 768 and a washer 770 may be used. It is to be understood that the nut 768 and a washer 770 aid in preventing the parking gear 904 from becoming disengaged with the first gear shaft 700 when the modular electric axle head assembly 902 is in operation.

Figure 10:
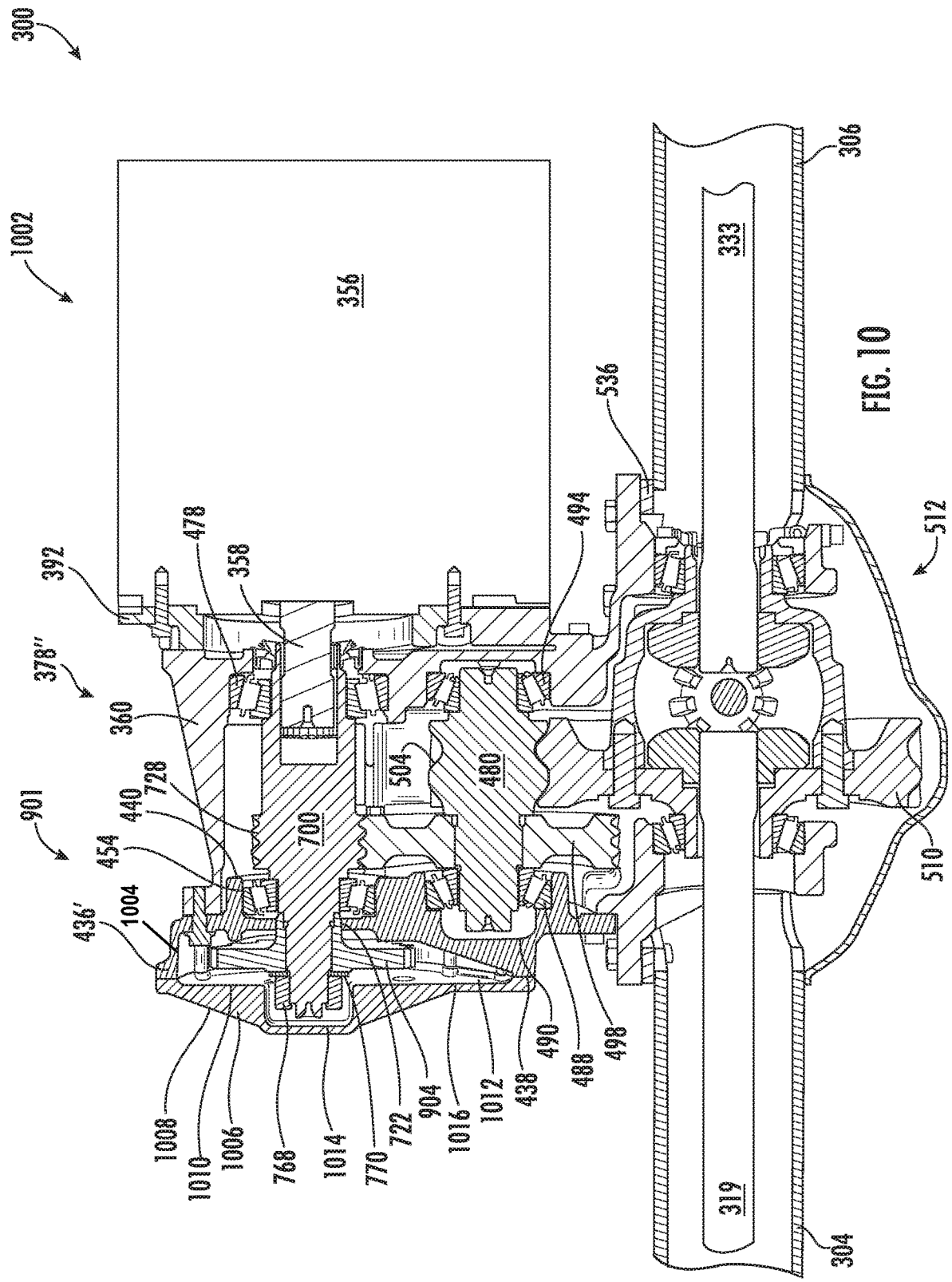
FIG. 10 is a schematic top-plan view of a modular electric axle head assembly according to still yet another embodiment of the disclosure.

FIG. 10 is a schematic top-plan view of a modular electric axle head assembly 1002 according to still yet another embodiment of the disclosure. The axle assembly 300 and the modular electric axle head assembly 1002 illustrated in FIG. 10 is the same as the axle assembly 300 and the modular electric axle head assemblies 302, 702, 802 and 902 illustrated in FIGS. 6-9, except where specifically noted below. In accordance with the embodiment illustrated in FIG. 10 and as a non-limiting example, the modular electric axle head assembly 1002 does not include the use of the gear housing cover 436 described and illustrated in relation to FIGS. 6-9 of the disclosure.

As best seen in FIG. 10 of the disclosure and as a non-limiting example, the modular electric axle head assembly 1002 includes the use of a gear housing cover 436'. The gear housing cover 436' illustrated in FIG. 10 is the same as the gear housing cover 436 illustrated in FIGS. 6-9, except where specifically noted below. According to the embodiment illustrated in FIG. 10 and as a non-limiting example, the gear housing cover 436' may include a brake assembly receiving portion 1004. In accordance with the embodiment illustrated in FIG. 10 and as a non-limiting example, the brake assembly receiving portion 1004 extends axially inward from at least a portion of the first side 438 of the gear housing cover 436'. As a non-limiting example, the brake assembly receiving portion 1004 may be of a size and shape to receive and/or retain at least a portion of the brake assembly 901. It is within the scope of this disclosure and as a non-limiting example that at least a portion of the parking gear 904, the parking pawl 918 and/or the actuation mechanism (not shown) of the brake assembly 901 may be received and/or retained within the brake assembly receiving portion 1004 of the gear housing cover 436'.

Disposed directly adjacent to at least a portion of the first side 438 of the gear housing cover 436' is a brake assembly cover 1006 having a first side 1008 and a second side 1010. The brake assembly cover 1006 and the gear housing cover 436' provide a housing for at least a portion of the brake assembly 901 of the modular electric axle head assembly 1002. As a result, it is therefore to be understood that the brake assembly cover 1006 aids in preventing the migration of dirt, debris and/or moisture into the gear assembly 278" and the brake assembly 901 thereby aiding in improving the overall life and durability of the modular electric axle head assembly 1002. It is within the scope of this disclosure and as a non-limiting example that at least a portion of the brake assembly cover 1006 may be integrally connected to at least a portion of the gear housing cover 436' by using one or more welds, one or more mechanical fasteners, one or more adhesives and/or a threaded connection.

Extending inward from at least a portion of the second side 1010 of the brake assembly cover 1006 and into the brake assembly cover 1006 is a first receiving portion 1012. The first receiving portion 1012 of the brake assembly cover 1006 is of a size and shape to receive and/or retain at least a portion of the brake assembly 901 of the modular electric axle head assembly 1002. As a result, it is within the scope of this disclosure and as a non-limiting example, that at least a portion of the parking gear 904, the parking pawl 918 and/or the actuation mechanism (not shown) may be disposed within the first receiving portion 1012 of the brake assembly cover 1006.

In accordance with the embodiment illustrated in FIG. 10 and as a non-limiting example, a second receiving portion 1014 extends inward into the brake assembly cover 1006 from at least a portion of an innermost surface 1016 of the first receiving portion 1012 of the brake assembly cover 1006. The second receiving portion 1014 of the brake assembly cover 1006 may be of a size and shape to receive and/or retain at least a portion of the first end portion 704 of the first gear shaft 700, the nut 768 and/or the washer 770 of the modular electric axle head assembly 1002.

Figure 11:
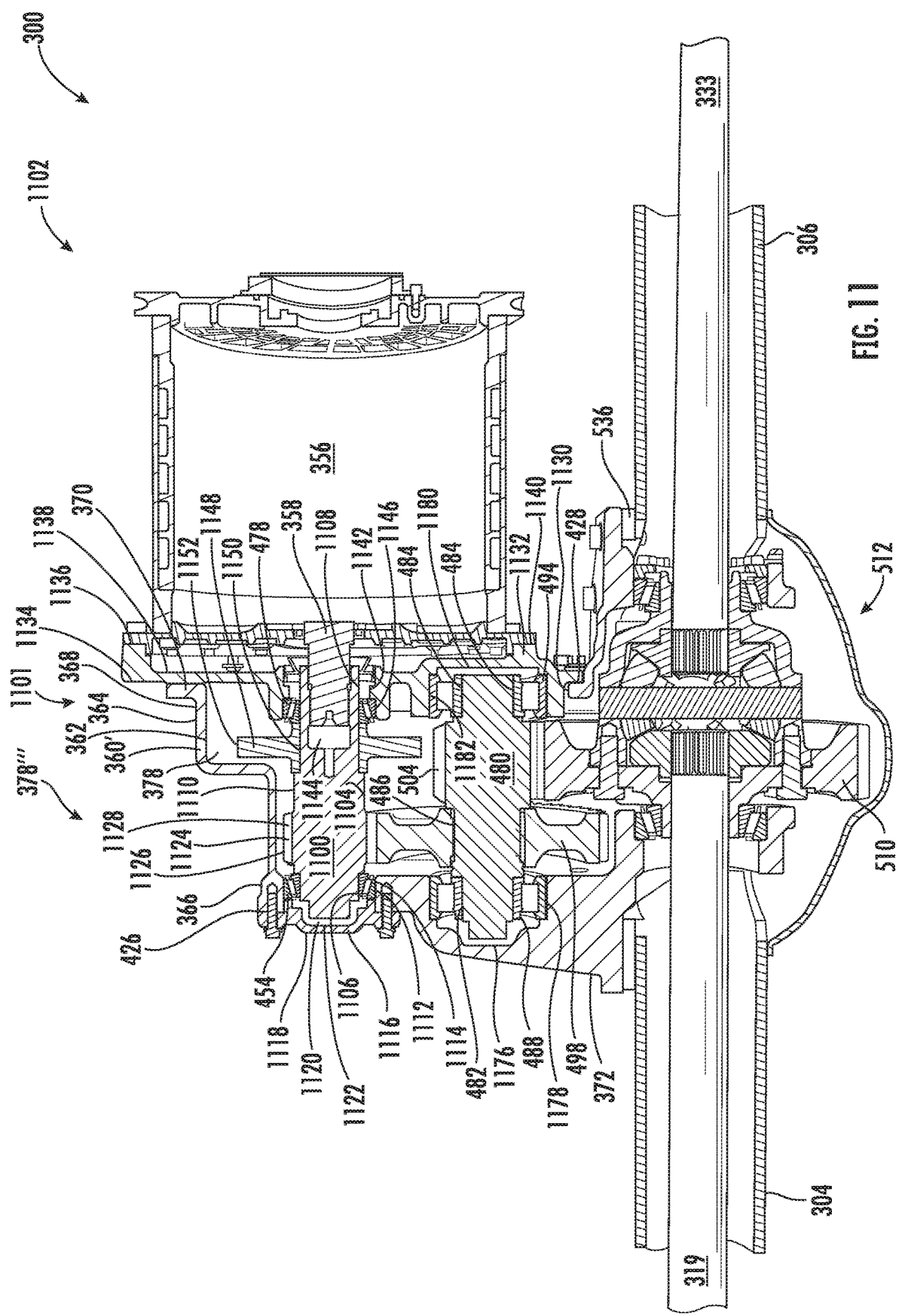
FIG. 11 is a schematic top-plan view of a modular electric axle head assembly according to still even yet a further embodiment of the disclosure.

FIGS. 11-11B provide a schematic illustration of a modular electric axle head assembly 1102 according to still even yet a further embodiment of the disclosure. The axle assembly 300 and the modular electric axle head assembly 1102 illustrated in FIGS. 11-1B is the same as the axle assembly 300 and modular electric axle head assemblies 302, 702, 802, 902 and 1002 illustrated in FIGS. 6-10, except where specifically noted below. In accordance with the embodiment illustrated in FIGS. 11-1B of the disclosure and as a non-limiting example, the modular electric axle head assembly 1102 does not include the first gear shaft 446 or 700 described and illustrated in relation to FIGS. 6-10. Additionally, in accordance with the embodiment illustrated in FIGS. 11-11B and as a non-limiting example, the modular electric axle head assembly 1102 does not include the motor mounting member 392 and the gear assembly housing 360 described and illustrated in relation to FIGS. 6-10 of the disclosure.

As best seen in FIG. 11 of the disclosure and as a non-limiting example, the modular electric axle head assembly 1102 includes a gear assembly 378'''. The gear assembly 378''' illustrated in FIGS. 11-11B is the same as the gear assemblies 378, 378' and 378" illustrated in FIGS. 6-10, except where specifically noted below. According to the embodiment illustrated in FIG. 11 and as a non-limiting example, the gear assembly 378''' includes a first gear shaft 1100 having an outer surface 1104, a first end portion 1106, a second end portion 1108 and an intermediate portion 1110 interposed between the first end second end portions 1106 and 1108. In accordance with the embodiment illustrated in FIG. 11 of the disclosure and as a non-limiting example, at least a portion of the first end portion 1106 of the first gear shaft 1100 extends through or is disposed within an opening 1112 extending from the inner surface 362 to the outer surface 364 of the inboard portion 370 of the first end 426 of a gear assembly housing 360'. At least a portion of the first end portion 1106 of the first gear shaft 1100 is rotationally supported by the one or more first bearing assemblies 454 interposed between the outer surface 1104 of the first gear shaft 1100 and a surface 1114 defining the opening 1112.

Disposed directly adjacent to at least a portion of the first end 426 of the gear assembly housing 360' is a gear housing cover 1116 having a first side 1118 and a second side 1120. The gear housing cover 1116 is of a size and shaft to seal the opening 1112 in the first end 426 of the gear assembly housing 360'. As a result, it is to be understood that the gear housing cover 1116 aids in preventing the migration of dirt, debris and/or moisture into the gear assembly 378''' thereby aiding in improving the overall life and durability of the gear assembly 378'''. It is within the scope of this disclosure and as a non-limiting example that the hear housing cover 1116 may be integrally connected to at least a portion of the first end 426 of the gear assembly housing 360' by using one or more welds, one or more mechanical fasteners, one or more adhesives and/or a threaded connection.

Extending inward into at least a portion of the second side of the 1120 of the gear housing cover 1116 is a receiving portion 1122. The receiving portion 1122 is of a size and shape to receive and/or retain at least a portion of the first end portion 1106 of the first gear shaft 1100 of the gear assembly 378'''.

It is within the scope of this disclosure and as a non-limiting example that at least a portion of the second side 1120 of the gear housing cover 1116 may be in direct contact with at least a portion of the one or more first bearing assemblies 454 of the gear assembly 378'''. As a result, it is to be understood that the gear housing cover 1116 may be precisely engineered in order to provide the pre-tensioning force and/or clearance needed for optimal operation of the one or more first bearing assemblies 454.

Connected to at least a portion of the outer surface 1104 of the first end portion 1106 of the first gear shaft 1100 is a first gear 1124. Circumferentially extending from at least a portion of an outer surface 1126 of the first gear 1124 is a plurality of first gear teeth 1128. According to an embodiment of the disclosure and as a non-limiting example, the first gear 1124 may be integrally formed as part of the first end portion 1106 of the first gear shaft 1100. The plurality of first gear teeth 1128 are complementary to and meshingly engaged with the plurality of second gear teeth 502 on the second gear 498 of the gear assembly 378'''. In accordance with an alternative embodiment of the disclosure and as a non-limiting example, the first gear 1124 may be integrally connected to at least a portion of the first end portion 1106 of the first gear shaft 1100 by using one or more adhesives, one or more mechanical fasteners, one or more welds, a threaded connection and/or a splined connection. It is within the scope of this disclosure and as a non-limiting example that the first gear 1124 may be a first reduction gear for the gear assembly 378''' of the modular electric axle head assembly 1102. As a non-limiting example, the plurality of first gear teeth 1128 extending from the outer surface 1126 of the first gear 1124 may be a plurality of hypoid gear teeth, spiral bevel gear teeth, helical gear teeth, spur gear teeth, double hypoid gear teeth, double spiral bevel gear teeth or double helical gear teeth.

According to the embodiment illustrated in FIG. 11 and as a non-limiting example, an opening 1130 may extend from the inner surface 362 to the outer surface 364 of the second end 428 of the gear assembly housing 360'. As best seen in FIG. 11 of the disclosure and as a non-limiting example, at least a portion of the second end portion 1108 of the first gear shaft 1100 and/or at least a portion of the second end portion 484 of the second gear shaft 480 is disposed within or extends through the opening 1130 in the gear assembly housing 360'.

Disposed directly adjacent to at least a portion of the second end 428 of the gear assembly housing 360' is a motor mounting member 1132 having a first side 1134, a second side 1136, an inboard portion 1138 and an outboard portion 1140. In accordance with the embodiment illustrated in FIG. 11 of the disclosure and as a non-limiting example, motor mounting member 1132 may have a size and shape needed to completely cover the opening 1130 in the second end 428 of the gear assembly housing 360'. As a result, it is therefore to be understood that the motor mounting member 1132 may aid in preventing the migration of dirt, debris and/or moisture into the gear assembly 378''' of the modular electric axle head assembly 1102.

Integrally connected to at least a portion of the second side 1136 of the motor mounting member 1132 is the motor 356 of the modular electric axle head assembly 1102. It is within the scope of this disclosure and as a non-limiting example that the motor 356 may be integrally connected to the motor mounting member 1132 by using one or more welds, one or more mechanical fasteners, one or more adhesives, a spline connection and/or a threaded connection.

As best seen in FIG. 11 of the disclosure and as a non-limiting example, at least a portion the motor output shaft 358 of the motor 356 is drivingly connected to at least a portion of the second end portion 1108 of the first gear shaft 1100. According to the embodiment illustrated in FIG. 11 of the disclosure and as a non-limiting example, at least a portion of the motor output shaft 358 may be received and/or retained within at least a portion of a hollow portion 1144 extending inward from an end of the first shaft 1100. It is within the scope of this disclosure and as a non-limiting example that the motor output shaft 358 may be drivingly connected to the first gear shaft 1100 by using one or more welds, one or more mechanical fasteners, one or more adhesives, a splined connection and/or a threaded connection.

Extending from the first side 1134 to the second side 1136 in the inboard portion 1138 of the motor mounting member 1132 of the gear assembly 378''' is an opening 1142. The opening 1142 of the motor mounting member 1132 may be of a size and shape to receive and/or retain at least a portion of the second end portion 1108 of the first gear shaft 1100 and/or at least a portion of the motor output shaft 358. In accordance with the embodiment illustrated in FIG. 11 and as a non-limiting example, at least a portion of the one or more second bearing assemblies 478 providing rotational support for the first gear shaft 1100 and/or the motor output shaft 358 may be interposed between the outer surface 1104 of the first gear shaft 1100 and a surface 1146 defining the opening 1142 of the motor mounting member 1132.

Integrally connected to at least a portion of the outer surface of the second end portion 1108 of the first gear shaft 1100 is a parking gear 1148 of the brake assembly 1101. As best seen in FIG. 11 of the disclosure and as a non-limiting example, the parking gear 1148 has an inner surface 1150 and an outer surface 1152. At least a portion of the inner surface 1150 of the parking gear 1148 is integrally connected to at least a portion of the outer surface 1104 of the second end portion 1108 of the first gear shaft 1100. It is within the scope of this disclosure and as a non-limiting example, that the parking gear 1148 may be integrally formed as part of the first gear shaft 1100 or integrally connected to at least a portion of the first gear shaft 1100 by using one or more welds, one or more mechanical fasteners, one or more adhesives, a spline connection and/or a threaded connection.

Circumferentially extending from at least a portion of the outer surface 1152 of the parking gear 1148 is a plurality of parking gear teeth 1154. As best seen in FIG. 11B of the disclosure and as a non-limiting example, the plurality of parking gear teeth 1154 are selectively engagable by one or more teeth 1156 of a parking pawl 1158 of the brake assembly 1101. When the parking pawl 1158 is in a first position (not shown), the one or more teeth 1156 of the parking pawl 1158 are not meshingly engaged with the plurality of parking gear teeth 1154 on the outer surface 1152 of the parking gear 1148. As a result, when the parking pawl 1158 is in the first position (not shown), the motor 356 is able to provide the rotational power needed to drive the first gear shaft 1100 and therefore the first and second axle half shaft 319 and 333 of the modular electric axle head assembly 11002. When the parking pawl 1158 is in a second position 1160 illustrated in FIG. 11B of the disclosure, the one or more teeth 1156 of the parking pawl 1158 are meshingly engaged with the plurality of parking gear teeth 1154 on the parking gear 1148. As a result, when the parking pawl 1158 is in the second position 1160. As a result, when the parking pawl 1158 is in the second position 1160 the motor 356 is unable to drive the first gear shaft 1100 and therefore cannot provide the rotational power needed to drive the first and second axle half shafts 319 and 333. It is therefore within the scope of this disclosure that the brake assembly 1101 may function as an anti-theft mechanism, a parking brake, a parking mechanism and/or a service brake. As a result, the brake assembly 1101 may be used alone or in combination with the one or more braking assemblies (not shown) located at the first and/or second wheel end assemblies (not shown) and/or in combination with the brake assemblies 701, 801 and/or 901 described herein.

In order to selectively transition the parking pawl 1158 between the first position (not shown) and the second position 1160, at least a portion of the parking pawl 1158 may be connected to at least a portion of an actuation mechanism 1162. It is within the scope of this disclosure and as a non-limiting example, that the actuation mechanism 1162 may be an actuator, a linear actuator, a cam actuation mechanism, an electro-magnetic actuator and/or an electro-mechanical actuation mechanism.

According to an embodiment of the disclosure (not shown) and as a non-limiting example, the brake assembly 1101 illustrated in FIGS. 11 and 11B may be used in place of the brake assemblies 701 and 801 or in combination with either the brake assemblies 701 and 801 described and illustrated in relation to FIGS. 7-8.

In order to aid in the assembly of the brake assembly 1101 of the modular electric axle head assembly 1102, the gear assembly housing 360' may further include a brake assembly aperture 1164 extending from the inner surface 362 to the outer surface 364 of the gear assembly housing 360'. The brake assembly aperture 1164 may be of a size and shape to receive and/or retain at least a portion of an assembly tool 1166 having first end portion 1168 and a second end portion 1170. As best seen in FIGS. 11A and 11B of the disclosure and as a non-limiting example, at least a portion of the first end portion 1168 of the assembly tool 1166 has a size and shape that is complementary to the size and shape of the brake assembly aperture 1164 in the gear assembly housing 360'.

When the first end portion 1168 of the assembly tool 1166 is inserted within the brake assembly aperture 1164, at least a portion of one or more legs 1172 of the first end portion 1168 of the assembly tool 1166 is in direct contact with at least a portion of the inner surface 362 of the gear assembly housing 360' thereby preventing the assembly tool 1166 from exiting the hollow interior portion 378 of the gear assembly housing 360'. As the assembly tool 1166 is inserted within the brake assembly aperture 1164 at least a portion of the first end portion 1168 of the assembly tool 1166 is driven into direct contact with at least a portion of the parking pawl 1158 thereby driving the parking pawl 1158 toward engagement with the parking gear 1148. As the parking pawl 1158 is driving into engagement with the parking gear 1148, a spring 1174 connected to at least a portion of the parking pawl 1158 and the gear assembly housing 360' is loaded with an amount of energy. When the one or more legs 1172 of the assembly tool 1166 are in contact with the inner surface 362 of the gear assembly housing 360', the parking pawl 1158 is in the second position 1160 providing the space needed to assemble the actuation mechanism 1162 within with gear assembly 378'''. As a result, it is therefore to be understood that the assembly tool 1166 aids in facilitating the assembly of the brake assembly 1101 of the modular electric axle head assembly 1102.

According to the embodiment illustrated in FIG. 11 the inner surface 362 of the outboard portion 372 of the first end portion 366 of the gear assembly housing 360' is a receiving portion 1176. It is within the scope of this disclosure and as a non-limiting example that the receiving portion 1176 may be of a size and shape needed to receive and/or retain at least a portion of the first end portion 482 of the second gear shaft 480 of the gear assembly 378'''. As best seen in FIG. 11 of the disclosure and as a non-limiting example, at least a portion of the one or more third bearing assemblies 488 are interposed between a surface 1178 defining the recessed portion 1176 and the outer surface 486 of the first end portion 482 of the second gear shaft 480.

In accordance with the embodiment illustrated in FIG. 11 of the disclosure and as a non-limiting example, at least a portion of the outboard portion 1140 of the first side 1134 of the motor mounting member 1132 is a receiving portion 1180. The receiving portion 1180 is of a size and shape to receive and/or retain at least a portion of the second end portion 484 of the second gear shaft 480 of the gear assembly 378'''. As best seen in FIG. 11 of the disclosure and as a non-limiting example, at least a portion of the one or more fourth bearing assemblies 494 are interposed between a surface 1182 defining the receiving portion 1180 and the outer surface 486 of the second end portion 484 of the second gear shaft 480.

Figure 12:
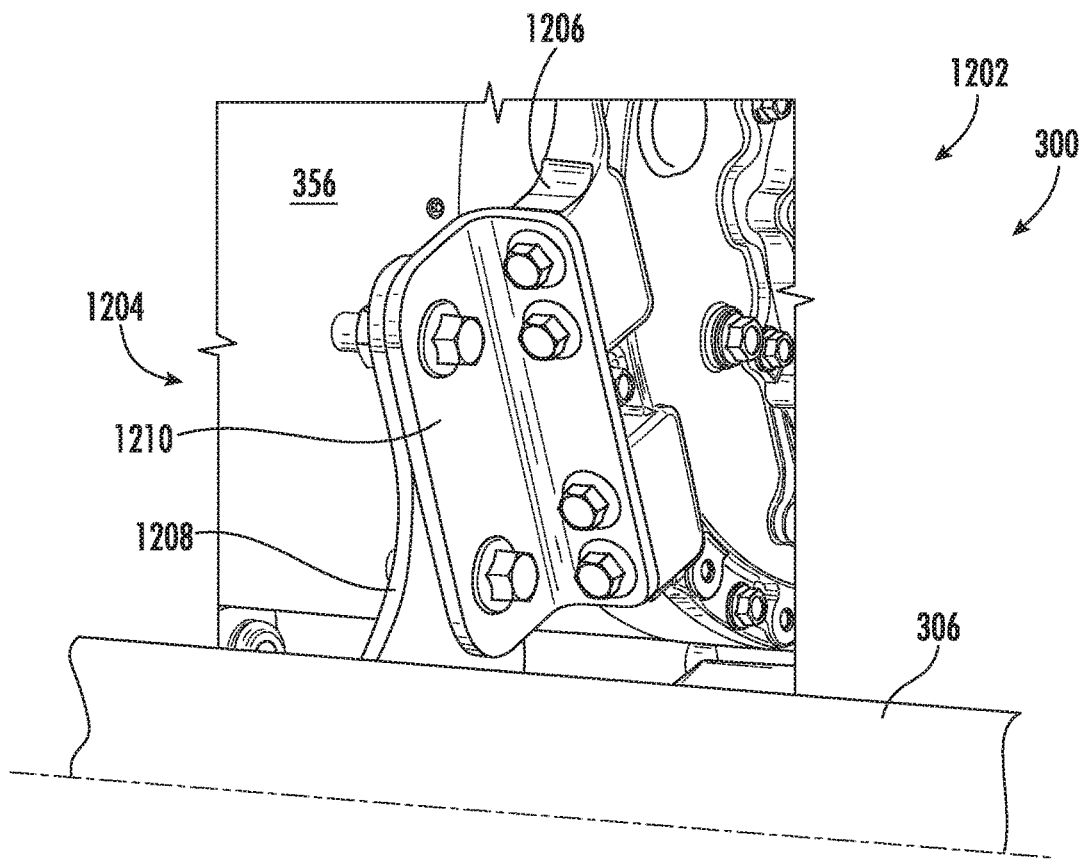
FIG. 12 is a schematic perspective view of a portion of the modular electric axle head assembly illustrated in FIGS. 6-11B having a motor stabilizing assembly according to an embodiment of the disclosure.

FIG. 12 is a schematic perspective view of a portion of the modular electric axle head assembly 1202 illustrated in FIGS. 6-11B having a motor stabilizing assembly 1204 according to an embodiment of the disclosure. The modular electric axle head assembly 1202 illustrated in FIG. 12 is the same as the modular electric axle head assemblies 302, 702, 802, 902, 1002 and 1102 illustrated in FIGS. 6-11B, except where specifically noted below. At least a portion of the motor stabilizing assembly 1204 is integrally connected to at least a portion of the motor 356 and the second axle half shaft housing 306 of the axle assembly 300. It is therefore to be understood that the motor stabilizing assembly 1204 aids in providing support to the motor 356 thereby improving the overall life and durability of the modular electric axle head assembly 1202.

As best seen in FIG. 12 of the disclosure and as a non-limiting example the motor stabilizing assembly 1204 may include a first portion 1206, a second portion 1208 and a third portion 1210. It is within the scope of this disclosure and as a non-limiting example that the first portion 1206 of the motor stabilizing assembly 1204 may be integrally formed as part of the motor 356 or may be integrally connected to at least a portion of the motor 356 by using one or more welds, one or more mechanical fasteners and/or one or more adhesives. Additionally, as best seen in FIG. 12 of the disclosure and as a non-limiting example, at least a portion of the second portion 1208 of the motor stabilizing assembly 1204 may be integrally formed as part of the second axle half shaft housing 306 or integrally connected to at least a portion of the second axle half shaft housing 306 by using one or more welds, one or more adhesives and/or one or more adhesives.

In accordance with the embodiment illustrated in FIG. 12 of the disclosure and as a non-limiting example, at least a portion of the third portion 1210 of the motor stabilizing assembly 1204 is integrally connected to at least a portion of the first portion 1206 of the motor stabilizing assembly 1204. Additionally, in accordance with the embodiment illustrated in FIG. 12 and as a non-limiting example, at least a portion of the third portion 1210 of the motor stabilizing assembly 1204 is integrally connected to at least a portion of the second portion 1208 of the motor stabilizing assembly 1204. It is within the scope of this disclosure and as a non-limiting example that the third portion 1210 of the motor stabilizing assembly 1204 may be integrally connected to the first and second portion 1206 and 1208 of the motor stabilizing assembly 1204 by using one or more welds, one or more mechanical fasteners and/or one or more adhesives.

Figure 13:
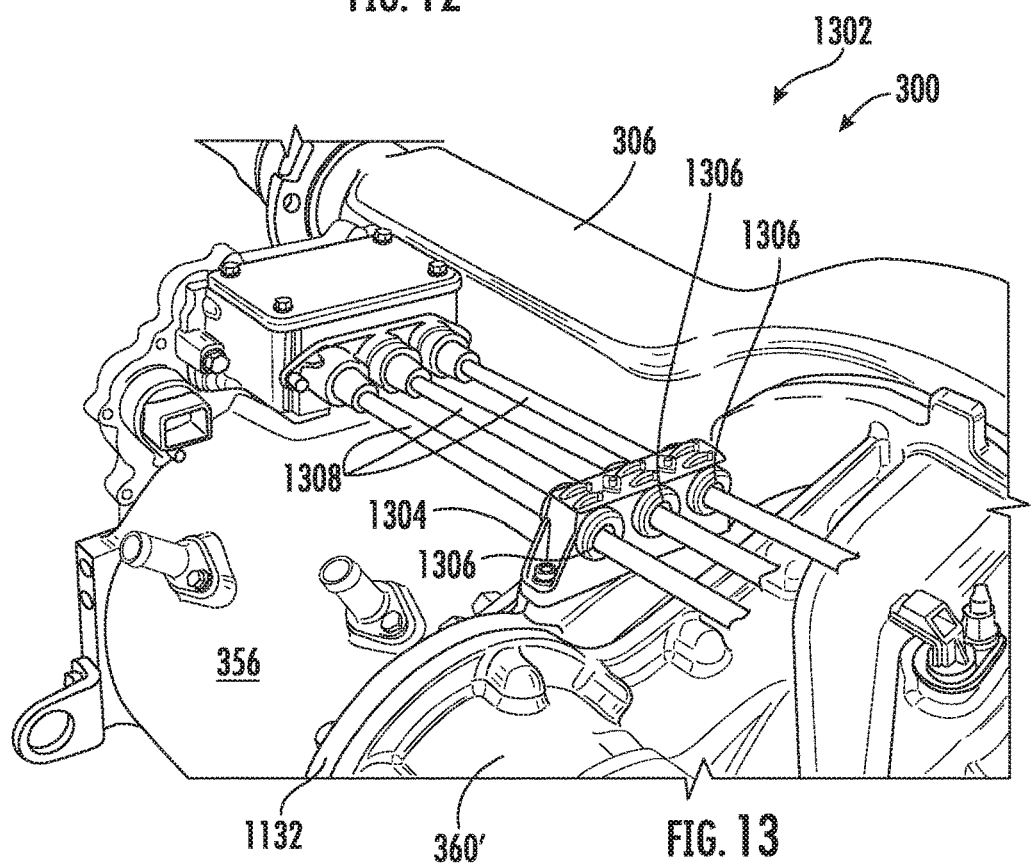
FIG. 13 is a schematic perspective view of a portion of the modular electric axle head assembly illustrated in FIGS. 6-12 having a strain relief member according to an embodiment of the disclosure.

FIG. 13 is a schematic perspective view of a portion of a modular electric axle head assembly 1302 having a strain relief member 1304 according to an embodiment of the disclosure. The modular electric axle head assembly 1302 illustrated in FIG. 13 is the same as the modular electric axle head assemblies 302, 702, 802, 902, 1002, 1102 and 1202 illustrated in FIGS. 6-12, except where specifically noted below. As illustrated in FIG. 13 of the disclosure and as a non-limiting example, at least a portion of the strain relief member 1304 is integrally connected to at least a portion of the motor mounting member 1132 of the modular electric axle head assembly 1302.

In accordance with the embodiment illustrated in FIG. 13 of the disclosure and as a non-limiting example, the strain relief member 1304 includes one or more retention apertures 1306. The one or more retention apertures 1306 are of a size and shape needed to receive and retain at least a portion of one or more terminals or data links 1308 needed to operate and/or control the motor 356 of the modular electric axle head assembly 1302. It is to be understood that the strain relief member 1304 provides the support needed in order to ensure that the one or more terminals or data links 1308 are not damaged or become prematurely disconnected from the motor 356. As a result, the strain relief member 1304 aids in improving the overall life and durability of the modular electric axle head assembly 1302 and the one or more terminals or data links 1308.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A modular electric axle head assembly, comprising:
   an axle assembly having a banjo portion with an inner surface, an outer surface, an inboard side and an outboard side;
   a first opening extends from said inner surface to said outer surface of said inboard side of said banjo portion of said axle assembly;
   a differential assembly having a differential case disposed within at least a portion of said banjo portion;
   a gear assembly drivingly connected to at least a portion of said differential assembly;
   a motor having a motor output shaft that is drivingly connected to at least a portion of said gear assembly;
   a gear assembly housing having an inboard portion, an outboard portion, an inner surface an outer surface defining a hollow portion therein;
      wherein said outboard portion of said gear assembly housing has an axle assembly mounting flange integrally connected to at least a portion of said inboard side of said banjo portion;
   a parking pawl that is selectively engagable with a parking gear by using an actuation mechanism;
      wherein a brake assembly aperture extends from said inner surface to said outer surface of said gear assembly housing;
      wherein said brake assembly aperture has a size and shape to receive and retain at least a portion of an assembly tool; and
   wherein when said assembly tool is disposed within said gear assembly housing, at least a portion of a first end portion of said assembly tool drives said parking pawl into engagement with said parking gear.

2. The modular electric axle head assembly of claim 1, wherein said gear assembly comprises:
   said first' gear shaft having a first gear;
   a second gear shaft having a second gear and a third gear;
      wherein at least a portion of said second gear is drivingly connected to said first gear of said gear assembly; and
      wherein at least a portion of said third gear is drivingly connected to at least a portion of a ring gear of said differential assembly.

3. The modular electric axle head assembly of claim 2, wherein said first gear has a plurality of first gear teeth;
   wherein said second gear has a plurality of second gear teeth;
   wherein said third gear has a plurality of third gear teeth; and
   wherein said plurality of first gear teeth, said plurality of second gear teeth and said plurality of third gear teeth have a helix angle that reduces or eliminates an amount of axial force experienced by said second gear shaft of said gear assembly when in operation.

4. The modular electric axle head assembly of claim 2, wherein said gear assembly housing further comprises an opening extending from said inner surface to said outer surface of said inboard portion of a first end of said gear assembly housing;
   wherein said opening in said inboard portion of said first end of said gear assembly housing provides rotational support for at least a portion of a first end portion of said first gear shaft; and
   wherein at least a portion of one or more first bearing assemblies are interposed between an outer surface of said first end portion of said first gear shaft and a surface defining said opening in said inboard portion of said first end of said gear assembly housing.

5. The modular electric axle head assembly of claim 1, further comprising a gear housing cover having a first side and a second side;
   wherein said gear housing cover has a size and shape to seal said opening in said inboard portion of said first end of said gear assembly housing; and
   wherein at least a portion of said gear housing cover is integrally connected to at least a portion of said first end of said gear assembly housing.

6. The modular electric axle head assembly of claim 5, wherein at least a portion of said second side of said gear housing cover is in direct contact with at least a portion of said one or more first bearing assemblies.

7. The modular electric axle head assembly of claim 5, wherein said gear housing cover further comprises a receiving portion in said second side of said gear housing cover; and
   wherein said reviving portion in said second side of said gear housing cover is of a size and shape to receive and/or retain at least a portion of said first end portion of said a first gear shaft of said gear assembly.

8. The modular electric axle head assembly of claim 1, wherein said gear assembly housing further comprises a receiving portion in said inner surface of said outboard portion of a first end portion of said gear assembly housing; and
   wherein at least a portion of one or more third bearing assemblies are interposed between an outer surface of a first end portion of said second gear shaft and a surface defining said receiving portion in said inner surface of said outboard portion of said first end portion of said gear assembly housing.

9. The modular electric axle head assembly of claim 1, further comprising a motor mounting member having a first side, a second side, an inboard portion and an outboard portion;
   wherein at least a portion of said first side of said motor mounting member is integrally connected to at least a portion of a second end of said gear assembly housing;
   wherein at least a portion of said second side of said motor mounting member includes a motor mounting portion;
   wherein at least a portion of said motor is mounted to said motor mounting portion of said motor mounting member;
   wherein a motor mounting member opening extends from said first side to said second side of said motor mounting member; and
   wherein at least a portion of said motor output shaft extends through said motor mounting member opening.

10. The modular electric axle head assembly of claim 9, wherein said motor mounting member opening is of a size and shape provide rotational support for at least a portion of a second end portion of said first gear shaft and said motor output shaft; and
    wherein at least a portion of one or more second bearing assemblies are interposed between an outer surface of said second end portion of said first gear shaft and a surface defining said motor mounting member opening.

11. The modular electric axle head assembly of claim 9, wherein said motor mounting member further comprises a receiving portion in said first side of said outboard portion of said motor mounting member;
    wherein at least a portion of one or more fourth bearing assemblies are interposed between an outer surface of said second end portion of said second gear shaft and a surface defining said receiving portion of said motor mounting member.

12. The modular electric axle head assembly of claim 2, wherein said one or more third bearing assemblies rotationally supporting an end of said second gear shaft are one or more cylindrical roller bearing assemblies; and
    wherein one or more fourth bearing assemblies rotationally supporting an end of said of said second gear shaft opposite said one or more third bearing assemblies are one or more cylindrical roller bearing assemblies.

13. The modular electric axle head assembly of claim 1, further comprising a brake assembly.

14. The modular electric axle head assembly of claim 1, wherein a first protruding portion and a second protruding portion extend from said axle assembly mounting flange of said gear assembly housing; and
    wherein at least a portion of said first protruding portion and said second protruding portion provide rotational support for at least a portion of said differential case of said differential assembly.

15. The modular electric axle head assembly of claim 1; wherein when said assembly tool is disposed within said gear assembly housing and has driven drives said parking pawl into engagement with said parking gear an amount of space needed to assemble said actuation mechanism into within said gear assembly is provided.

16. The modular electric axle head assembly of claim 1, further comprising a brake assembly comprising a rotor portion and a caliper assembly that is selectively engagable with said rotor portion of said brake assembly; and
    wherein at least a portion of said rotor portion of said brake assembly is integrally drivingly connected to at least a portion of said first gear shaft of said gear assembly.

17. The modular electric axle head assembly of claim 16, further comprising a braking assembly cover; and
    wherein at least a portion of said braking assembly cover encases at least a portion of said rotor portion and said caliper assembly of said brake assembly.

18. The modular electric axle head assembly of claim 13, wherein said brake assembly is a drum brake assembly that is drivingly connected to at least a portion of said first gear shaft.

19. The modular electric axle head assembly of claim 9, further comprising a strain relief member integrally connected to at least a portion of said motor mounting member;
    wherein said strain relief member has one or more retention apertures; and
    wherein said one or more retention apertures are of a size and shape to receive and/or retain at least a portion of one or more terminals or data links used in said operation and/or control of said motor.

20. The modular electric axle head assembly of claim 1, further comprising a motor stabilizing assembly; and
    wherein at least a portion of said motor stabilizing assembly is integrally connected to at least a portion of said motor and an axle half shaft housing of said axle assembly.

21. The modular electric axle head assembly of claim 2, further comprising a gear housing cover having a first side, a second side, an inboard portion and an outboard portion;
    wherein at least a portion of said gear housing cover is integrally connected to at least a portion of a first end of said gear assembly housing;
    wherein said inboard portion of said second side of said gear housing cover has a first receiving portion and said outboard portion of said second side of said gear housing cover has a second receiving portion;
    wherein at least a portion of said first end portion of said first gear shaft is received within at least a portion of one or more first bearing assemblies disposed within said first receiving portion of said gear housing cover; and
    wherein at least a portion of a first end portion of said second gear shaft is received within one or more third bearing assemblies disposed within at least a portion of said second receiving portion of said gear housing cover.

22. The modular electric axle head assembly of claim 21, wherein said gear assembly housing further comprises a receiving portion in said inner surface of said outboard portion of said second end portion of said gear assembly housing; and wherein at least a portion of a second end portion of said second gear shaft is received within one or more fourth bearing assemblies disposed within at least a portion of said receiving portion in said inner surface of said outboard portion of said second end portion of said gear assembly housing.

\* \* \* \* \*